United States Patent
Aoshima

(10) Patent No.: US 6,800,970 B2
(45) Date of Patent: Oct. 5, 2004

(54) MOTOR AND OPTICAL APPARATUS USING THE SAME

(75) Inventor: Chikara Aoshima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/434,060

(22) Filed: May 9, 2003

(65) Prior Publication Data

US 2003/0178911 A1 Sep. 25, 2003

Related U.S. Application Data

(62) Division of application No. 09/910,046, filed on Jul. 23, 2001.

(30) Foreign Application Priority Data

Jul. 28, 2000 (JP) ........................................ 2000-228087
Jul. 31, 2000 (JP) ........................................ 2000-230959
Nov. 20, 2000 (JP) ........................................ 2000-352373

(51) Int. Cl.⁷ ........................ H02K 37/10; H02K 37/00; H02K 1/12; G03B 9/12; G03B 9/14
(52) U.S. Cl. ................ 310/49 R; 310/254; 310/156.25; 310/156.02; 310/46; 310/40 R; 396/464; 396/235; 355/42; 355/101; 355/124
(58) Field of Search ................................. 310/266, 254, 310/49 R, 46, 40 R, 10, 114, 156.25, 156.02

(56) References Cited

U.S. PATENT DOCUMENTS

| 3,754,824 A | * | 8/1973 | Weisglass et al. ............. 355/35 |
| 3,903,529 A | * | 9/1975 | Sorimachi et al. ............ 396/67 |
| 3,914,721 A | * | 10/1975 | Pollock ........................ 355/35 |
| 3,966,320 A | * | 6/1976 | Wiessner ..................... 355/73 |
| 4,229,098 A | * | 10/1980 | Schmoker ..................... 355/60 |
| 4,240,728 A | * | 12/1980 | Wiedmann et al. ......... 396/238 |
| 4,396,272 A | * | 8/1983 | Shono et al. ................ 396/235 |
| 4,497,557 A | * | 2/1985 | Petersen ..................... 396/464 |
| 4,558,938 A | * | 12/1985 | Petersen ..................... 396/464 |
| 4,583,845 A | * | 4/1986 | Lucht et al. ................... 355/46 |

(List continued on next page.)

FOREIGN PATENT DOCUMENTS

| EP | 0 892 484 | 1/1999 |
| JP | 57-166847 | 10/1982 |
| JP | 4-244774 | 9/1992 |
| JP | 2000-324788 | 11/2000 |

*Primary Examiner*—Karl Tanai
*Assistant Examiner*—Pedro J Cuevas
(74) *Attorney, Agent, or Firm*—Fitzpatrick, Cella, Harper & Scinto

(57) ABSTRACT

A motor includes a cylindrical magnet, first outer magnetic pole portions which are formed by gapping part of a cylinder from the distal end in the axial direction of the motor, and which oppose the outer circumferential surface of the magnet, second outer magnetic pole portions which are formed by gapping part of a cylinder from the distal end in the axial direction, and which oppose the outer circumferential surface of the magnet, first inner magnetic pole portions opposing the inner circumferential surface of the magnet, second inner magnetic pole portions opposing the inner circumferential surface of the magnet, a first coil which is located at a position between the first outer magnetic pole portions and the first inner magnetic pole portions in the axial direction of the magnet, and which excites the first outer magnetic pole portions, a second coil which is located between the second outer magnetic pole portions and the second inner magnetic pole portions on the side opposite the first coil in the axial direction of the magnet, and which excites the second outer magnetic pole portions, and an annular member which is in contact with the inner circumferential surface of the magnet, and which fits with at least the first inner magnetic pole portions or second inner magnetic pole portions.

10 Claims, 22 Drawing Sheets

U.S. PATENT DOCUMENTS

| | | | | |
|---|---|---|---|---|
| 4,598,989 A | * | 7/1986 | Yamada et al. | 396/103 |
| 4,623,233 A | * | 11/1986 | Yamada et al. | 396/464 |
| 4,716,432 A | * | 12/1987 | Stephany | 396/235 |
| 4,739,359 A | * | 4/1988 | Fukahori et al. | 396/85 |
| 4,751,543 A | * | 6/1988 | Kodaira et al. | 396/235 |
| 4,786,944 A | * | 11/1988 | Sakamoto et al. | 355/20 |
| 4,796,667 A | * | 1/1989 | Kehl et al. | 137/629 |
| 4,821,079 A | * | 4/1989 | Yoder | 355/74 |
| 4,839,679 A | * | 6/1989 | Cameron et al. | 396/469 |
| 4,851,870 A | * | 7/1989 | Tanaka et al. | 396/235 |
| 4,931,826 A | * | 6/1990 | Lucht et al. | 355/28 |
| 5,091,793 A | * | 2/1992 | Goto et al. | 359/831 |
| 5,099,277 A | * | 3/1992 | Lucht et al. | 355/73 |
| 5,150,149 A | * | 9/1992 | Alligood et al. | 396/242 |
| 5,245,372 A | | 9/1993 | Aoshima | 354/106 |
| 5,283,604 A | | 2/1994 | Aoshima | 354/21 |
| 5,325,142 A | * | 6/1994 | Depatie et al. | 396/449 |
| 5,353,078 A | | 10/1994 | Aoshima | 354/105 |
| 5,391,866 A | * | 2/1995 | Hoshino et al. | 250/201.2 |
| 5,432,576 A | * | 7/1995 | SanGregory et al. | 396/449 |
| 5,481,323 A | | 1/1996 | Egawa et al. | 354/106 |
| 5,517,364 A | * | 5/1996 | Suzuki | 359/823 |
| 5,555,060 A | * | 9/1996 | O'Brien et al. | 396/508 |
| 5,563,673 A | | 10/1996 | Aoshima | 396/516 |
| 5,706,120 A | * | 1/1998 | O'Brien et al. | 359/230 |
| 5,825,560 A | * | 10/1998 | Ogura et al. | 359/822 |
| 5,831,356 A | | 11/1998 | Aoshima | 310/49 |
| 5,847,887 A | * | 12/1998 | Ogura et al. | 359/822 |
| 5,899,591 A | | 5/1999 | Aoshima | 396/413 |
| 5,925,945 A | | 7/1999 | Aoshima | 310/49 R |
| 5,945,753 A | | 8/1999 | Maegawa et al. | 310/68 B |
| 5,959,669 A | * | 9/1999 | Mizoguchi et al. | 348/362 |
| 5,969,453 A | | 10/1999 | Aoshima | 310/156.12 |
| 5,973,425 A | | 10/1999 | Aoshima | 310/49 R |
| 6,046,517 A | | 4/2000 | Sasaki et al. | 310/40 MM |
| 6,049,677 A | | 4/2000 | Ueda et al. | 396/319 |
| 6,081,053 A | | 6/2000 | Maegawa et al. | 310/49 R |
| 6,157,107 A | | 12/2000 | Aoshima et al. | 310/156.02 |
| 6,172,440 B1 | | 1/2001 | Sasaki et al. | 310/156.02 |
| 6,222,287 B1 | | 4/2001 | Suzuki | 310/49 R |
| 6,255,749 B1 | | 7/2001 | Aoshima et al. | 310/49 R |
| 6,316,851 B1 | | 11/2001 | Maegawa et al. | 310/49 R |
| 6,411,003 B1 | | 6/2002 | Sasaki et al. | 310/156.02 |
| 6,447,175 B1 | * | 9/2002 | Ogawa | 396/488 |
| 6,465,916 B1 | | 10/2002 | Aoshima | 310/49 R |
| 6,550,987 B2 | * | 4/2003 | Ogawa | 396/488 |
| 6,559,569 B2 | * | 5/2003 | Aoshima | 310/112 |
| 6,605,176 B2 | * | 8/2003 | Tzu | 156/345.26 |

* cited by examiner

US 6,800,970 B2

MOTOR AND OPTICAL APPARATUS USING THE SAME

BACKGROUND OF THE INVENTION

1. Field of the Invention

The present invention relates to an ultra-compact motor, and a light amount adjusting apparatus and a lens barrel each of which uses the motor.

2. Related Background Art

FIG. 20 shows a conventional compact cylindrical stepping motor. A stator coil 205 is concentrically wound around a bobbin 201. The bobbin 201 is clamped and fixed between two stator yokes 206 in the axial direction. On the stator yokes 206, stator teeth 206a and 206b are arranged on the inner surface of the bobbin 201 alternately in its circumferential direction. The stator yoke 206, integrally formed with the stator teeth 206a, 206b, is fixed to a case 203 to form a stator 202.

A flange 215 and bearing 208 are fixed to one of two cases 203, and the other bearing 208 is fixed to the other case 203. A rotor 209 is formed by a rotor magnet 211 fixed to a rotor shaft 210. The rotor magnet 211 and the stator yoke 206 of the stator 202 form a radial gap portion therebetween. The rotor shaft 210 is rotatably supported between the two bearings 208.

In the conventional compact stepping motor shown in FIG. 20, however, the cases 203, bobbins 201, stator coils 205, and stator yokes 206 are concentrically arranged around the rotor, and hence the outer dimensions of the motor become large. As shown in FIG. 21, the magnetic flux generated upon energization of the stator coil 205 mainly runs through end faces 206a1 and 206b1 of the stator teeth 206a and 206b. For this reason, the magnetic flux does not effectively act on the rotor magnet 211. Consequently, the output level of the motor does not rise remarkably.

The present applicant has proposed a motor that solves such a problem in U.S. Pat. No. 5,831,356. FIG. 22 shows this motor. In this motor, a rotor 311 formed by a magnet alternately magnetized to different poles at equal intervals in the circumferential direction is formed into a cylindrical shape. A first coil 312, the rotor 311, and a second coil 313 are sequentially arranged in the axial direction of the rotor. First outer magnetic poles 314a and 314b and first inner magnetic poles 314c and 314d, which are excited by the first coil 312, are opposed to the outer and inner circumferential surfaces of the rotor 311, respectively. Second outer magnetic poles 315a and 315b and second inner magnetic poles 315c and 315d, which are excited by the second coil 313, are opposed to the outer and inner circumferential surfaces of the rotor 311, respectively. A rotating shaft 317 serving as a rotor shaft is joined to the magnet of the cylindrical rotor 311.

A motor having such an arrangement can be reduced in outer dimensions, and the output level can be raised. In addition, if the magnet of the rotor 311 is formed thin, the distance between the first outer magnetic poles 314a and 314b and the first inner magnetic poles 314c and 314d and the distance between the second outer magnetic poles 315a and 315b and the second inner magnetic poles 315c and 315d can be reduced. That is, the reluctance of a magnetic circuit which acts on the magnet can be reduced. Therefore, a large amount of magnetic flux can be generated even by supplying small currents to the first and second coils 312 and 313.

A motor of the type disclosed in U.S. Pat. No. 5,831,356 is designed such that the magnet of the rotor 311 is held via an output shaft 317 and a bearing portion 314e (315e) of a stator 314 (315) that forms magnetic poles with certain gaps therebetween being ensured with respect to the outer magnetic poles 314a and 314b (315a and 315b) and inner magnetic poles 314c and 314d (315c and 315d) of the stator 314 (315). For this reason, when considering distortion of the output shaft, e.g., distortion due to a change in temperature, and the like, the gaps between the magnet and the outer and inner magnetic poles of the stator must be maintained with high precision. There is room for improvement in this point.

SUMMARY OF THE INVENTION

One aspect of this invention is to provide a compact motor including a cylindrical rotor formed by a magnet divided into equal portions in the circumferential direction, which are alternately magnetized with different polarities first and second coils positioned on two sides of the rotor in the axial direction, first and second outer magnetic pole portions which oppose the outer circumferential surfaces of the coils and magnet and excited by the first and second coils, respectively, and first and second inner magnetic pole portions which oppose the inner circumferential surfaces of the coils and magnet, wherein the gaps between the magnet and the respective magnetic pole portions can be defined with high precision using an annular member fitted on an inner circumferential surface of the magnet and regulating the position of the magnet in the radial direction.

In addition, this motor may include an annular member which is fitted on the outer circumferential surface of the magnet, instead of the inner circumferential surface, and which regulates the position of the magnet in the radial direction.

Furthermore, since the magnet rotatably fits within the annular member, a hollow compact motor can be realized.

DETAILED DESCRIPTION OF THE PREFERRED EMBODIMENTS (First Embodiment)

FIGS. 1 to 4 are views showing a motor (stepping motor) according to the first embodiment of the present invention.

Figure 1:
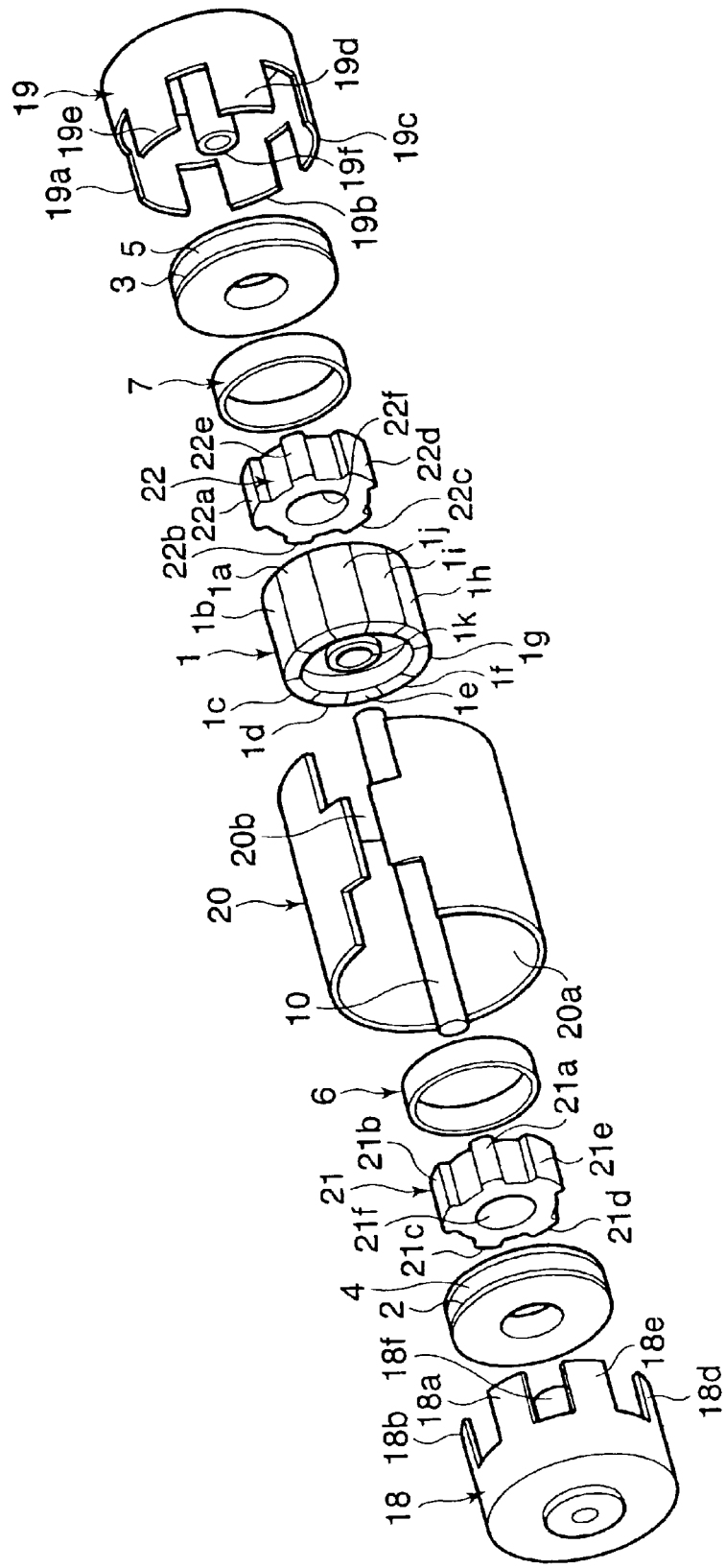
FIG. 1 is an exploded perspective view of a motor according to the first embodiment.
Figure 2:
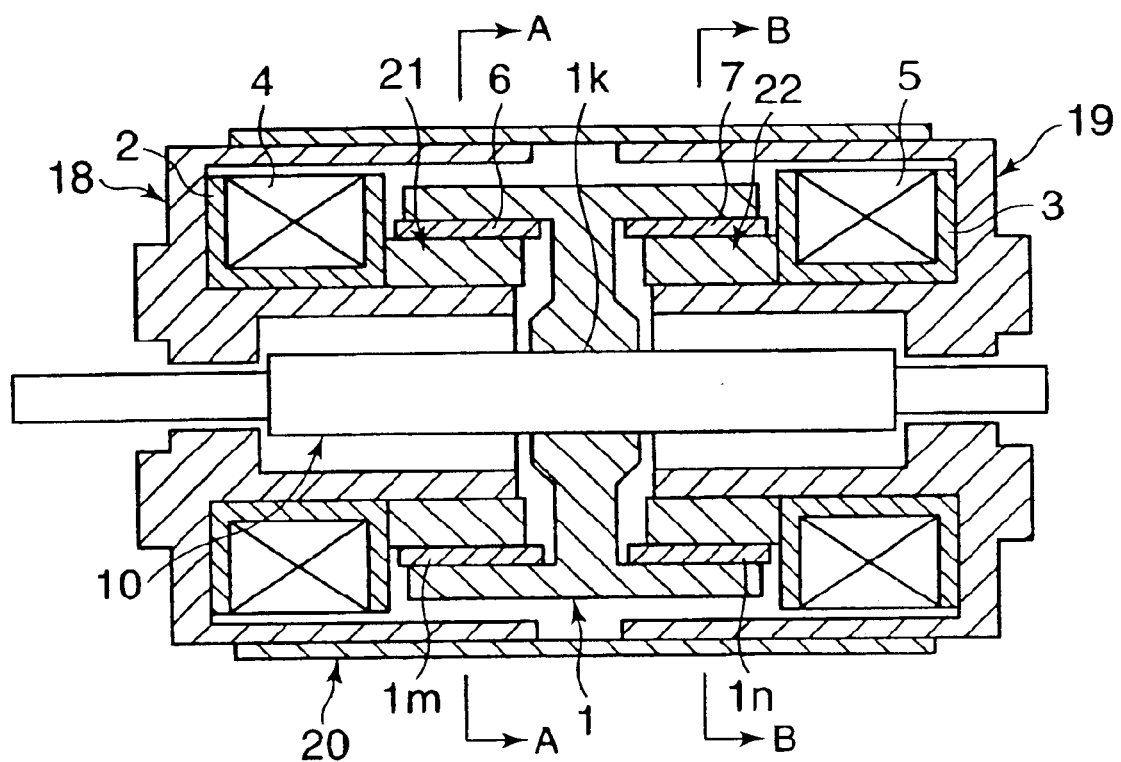
FIG. 2 is a longitudinal sectional view of the motor in FIG. 1 in the axial direction after assembly.

FIG. 1 is an exploded perspective view of the motor according to the first embodiment of the present invention. FIG. 2 is a longitudinal sectional view showing the motor in FIG. 1 in the axial direction after assembly. FIG. 3 is a sectional view, which is taken along a line A-A in FIG. 2, and shows a rotated state of a rotor. FIG. 4 is a sectional view, which is taken along a line B-B in FIG. 2, and shows a rotated state of the rotor. Referring to FIGS. 1 and 2, a cylindrical magnet 1 forms the rotor. The cylindrical circumferential surface of the magnet 1 is divided into n portions (10 portions in this embodiment) in the circumferential direction, which are alternately magnetized to S and N poles to form magnetized portions 1a, 1b, 1c, 1d, 1e, 1f, 1g, 1h, 1i, and 1j. That is, if the magnetized portions 1a, 1c, 1e, 1g, and 1i are magnetized to the S pole, the magnetized portions 1b,.1d, 1f, 1h, and 1j are magnetized to the N pole.

The magnet 1 is made of a plastic magnet material by injection molding. This makes it possible to greatly reduce the thickness of the cylindrical shape of the magnet 1 in the radial direction. A flange portion extends inward in the radial direction at the central portion of the inner surface of the magnet 1 in the axial direction. A through hole (fitting portion) 1k through which a rotor shaft is inserted and fixed is formed in the central portion of this flange portion. An output shaft 10, serving as a rotor shaft, is fixed in the fitting portion 1k of the magnet 1 by press fitting. The magnet 1 is a plastic magnet formed by injection molding. Even if, therefore, assembly is performed by press fitting, no crack is produced. In addition, this motor can be easily manufactured in spite of its complicated shape having the fitting portion 1k with a small inner diameter formed in the axial central portion. The output shaft 10 and magnet 1 are assembled and fixed by press fitting, and hence can be easily manufactured at a low cost.

As a material for the magnet 1, for example, a plastic magnet formed by injecting a mixture of Nd—Fe—B rare-earth magnetic powder and a thermoplastic resin binder material such as polyamide is used. A conventional magnet formed by compression molding has a bending strength of about 500 Kgf/cm$^2$. In contrast to this, when, for example, polyamide resin is used as a binder material, the magnet has a bending strength of about 800 Kgf/cm$^2$ or more. Therefore, a thin structure that cannot be obtained by conventional compression molding can be obtained, and a thin, cylindrical magnet 1 can be formed. Forming the magnet 1 into a thin cylindrical structure effectively improves the performance of the motor (as will be described below). In addition, since a shape can be arbitrarily selected for the magnet 1, a shape for fixing the rotor shaft, which cannot be obtained by compression molding, can be integrally formed. With this structure, the rotor shaft can have sufficient strength. Furthermore, since the rotor shaft has high strength, it does not crack even if it is fixed by press fitting or the like.

At the same time, since the rotor shaft fixing portion is integrally formed, the coaxial precision of the magnet portion with respect to the rotor shaft portion improves, and run-out or fluctuation can be reduced. In addition, the gap distance between the magnet and the stator portion can be reduced. The compression magnet has a maximum energy product of 8 MGOe or more, whereas the injection-molded magnet has a maximum energy product of about 5 to 7 MGOe. However, a sufficient output torque for the motor can be obtained. Since a thin resin film is formed on the surface of the injection-molded magnet, the formation of rust can be greatly suppressed as compared with the compression magnet. Therefore, an anti-corrosion process, such as a coating, can be omitted. Furthermore, the injection-molded motor is free from problems posed in the compression magnet. That is, no magnetic powder adheres to the magnet and the surface of the motor does not bulge, which tends to occur when an anti-corrosion coating is formed. This makes it possible to attain an improvement in quality.

Referring to FIGS. 1 and 2, this motor includes a first bobbin 2, a second bobbin 3, a cylindrical first coil 4 wound around the first bobbin 2, and a cylindrical second coil 5 wound around the second bobbin 3. The first and second coils 4 and 5 are concentric with respect to the magnet 1 and located so as to sandwich the magnet 1 in the axial direction. The outer diameters of the first and second coils 4 and 5 are almost equal to that of the magnet 1. First and second stators 18 and 19 are made of a soft magnetic material. The first and second stators 18 and 19 are arranged with a phase shift of 180/n°. Since n=10 in this embodiment, they are arranged with a phase shift of 18°. The first and second stators 18 and 19 are composed of outer and inner cylinders. The distal end portion of the outer cylinder (the stator 18) is formed into outer magnetic pole portions 18a, 18b, 18c, 18d, and 18e. As shown in FIG. 1, the first outer magnetic pole portions are formed into the shape of teeth by partly gapping the distal end of the outer cylinder in the axial direction. Thus, the first outer magnetic pole portions are formed into the shape of comb teeth arranged in the circumferential direction without any reduction in inner diameter. As is obvious from FIG. 1 and 2, only gaps exist between the adjacent teeth. In addition, the first outer magnetic pole portions 18a, 18b, 18c, 18d, and 18e of the first stator 18 are formed at angular intervals of 360/(n/2)°, i.e., 72° to be in phase with the magnetization of the magnet 1.

A first auxiliary stator 21 has an inner surface 21f fixed in an inner cylinder 18f of the first stator 18 by fitting. First inner magnetic pole portions 21a, 21b, 21c, 21d, and 21e are also formed at angular intervals of 360/(n/2)°, i.e., 72°, to be in phase with the magnetization of the magnet 1. The first inner magnetic pole portions 21a, 21b, 21c, 21d, and 21e are formed on the outer surface of the first auxiliary stator 21 so as to face the first outer magnetic pole portions 18a, 18b, 18c, 18d, and 18e. The first outer magnetic poles and first inner magnetic poles extend from the first coil 4 toward the magnet in the same direction. Therefore, one end of the magnet is inserted between the outer and inner magnetic poles at which the air gap becomes minimum. Consequently, the magnetic flux generated upon energization of the first coil 4 runs through the magnet 1 to effectively act on it.

The second stator and second auxiliary stator have the same arrangements as those of the first stator and first auxiliary stator, respectively. The distal end portion of the second stator 19 is formed into second outer magnetic pole portions 19a, 19b, 19c, 19d, and 19e. The second outer magnetic pole portions are formed by partly gapping the distal end of the outer cylinder in the axial direction. With this process, the second outer magnetic poles are formed into the shape of comb teeth without any reduction in inner diameter. A second auxiliary stator 22 has an inner surface 22f fixed in an inner cylinder 19f of the second stator 19 by fitting. The second inner magnetic pole portions 22a, 22b, 22c, 22d, and 22e are formed at angular intervals of 360/(n/2)°, i.e., 72°, to be in phase with the magnetization of the magnet 1. The second outer magnetic pole portions 19a, 19b, 19c, 19d, and 19e of the second stator 19 are also formed at angular intervals of 360/(n/2)°, i.e., 72°, to be in phase with the magnetization of the magnet 1. The second inner magnetic pole portions 22a, 22b, 22c, 22d, and 22e are formed on the outer surface of the second auxiliary stator 22 so as to face the second outer magnetic pole portions 19a, 19b, 19c, 19d, and 19e of the second stator. The second outer magnetic poles and second inner magnetic poles extend from the second coil 5 toward the magnet in the same direction. Therefore, one end of the magnet is inserted between the outer and inner magnetic poles at which the air gap becomes minimum. Consequently, the magnetic flux generated upon energization of the second coil 5 runs through the magnet 1 to effectively act on it.

The first outer magnetic pole portions 18a, 18b, 18c, 18d, and 18e and second outer magnetic pole portions 19a, 19b, 19c, 19d, and 19e are formed by gapped holes and teeth extending parallel to the motor axis. This arrangement allows the formation of magnetic poles that limit the diameter of the motor to a small value. If outer magnetic pole portions are formed by recesses/projections extending in the radial direction, the diameter of the motor increases accordingly for the following reason. In order to make the recesses/projections effectively serve as magnetic poles, the influence of a magnetic flux from the recesses must be reduced, and the influence of a magnetic flux from the projections must be increased. For this purpose, the difference between the recesses and the projections must be increased, resulting in an increase in diameter. In this embodiment, since the outer magnetic pole portions are formed by gapped holes and teeth extending parallel to the motor axis, the diameter of the motor can be limited to a small value. The first outer magnetic pole portions 18a, 18b, 18c, 18d, and 18e and first inner magnetic pole portions 21a, 21b, 21c, 21d, and 21e are formed to sandwich one end side of the magnet 1 so as to face the outer and inner circumferential surfaces of one end side of the magnet 1. The second outer magnetic pole portions 19a, 19b, 19c, 19d, and 19e and second inner magnetic pole portions 22a, 22b, 22c, 22d, and 22e are formed to sandwich the other side of the magnet 1 so as to face the outer and inner circumferential surfaces of the magnet 1. With this arrangement, the magnet on which the first outer magnetic poles and first inner magnetic poles act and the magnet on which the second outer magnetic poles and second inner magnetic poles act can be integrated as one magnet. With this arrangement, the phases corresponding to the magnets of the first and second outer magnetic poles easily can be set at correct positions.

A first intermediate member 6 has a hollow cylindrical shape. The inner surface of the first intermediate member 6 rotatably fits on the outer surfaces 21a, 21b, 21c, 21d, and 21e of the first auxiliary stator 21, which serve as the first inner magnetic pole portions. The outer circumferential surface of the first intermediate member 6 rotatably fits in an inner circumferential surface 1m of the magnet 1. A second intermediate member 7 has a hollow cylindrical shape. The inner surface of the second intermediate member 7 rotatably fits on the outer surfaces 22a, 22b, 22c, 22d, and 22e of the second auxiliary stator 22, which serve as the second inner magnetic portions. The outer circumferential surface of the second intermediate member 7 rotatably fits in an inner circumferential surface 1n of the magnet 1. The magnet 1 is rotatably held by the first and second intermediate members 6 and 7. The gap between the inner circumferential surface (inner surface) of the magnet 1 and the first or second inner magnet pole portions is defined by only the thicknesses of the first and second intermediate members 6 and 7. This makes it possible to maintain the gap with high precision and stabilize the output characteristics of motors in mass production.

As described above, the magnet 1 is made of a plastic magnet material by injection molding. This makes it possible to greatly reduce the thickness of the magnet in the radial direction of the cylindrical shape. This can greatly reduce the distance between the first outer magnetic pole portions 18a, 18b, 18c, 18d, and 18e of the first stator 18 and the first inner magnetic pole portions 21a, 21b, 21c, 21d, and 21e, thus reducing the reluctance of the magnetic circuit formed by the first coil 4 and first stator 18. Obviously, the same applies to the second stator 19. This makes it possible to generate a magnetic flux with a small amount of current and attain an increase in the output level of the motor, a reduction in power consumption, and a reduction in the size of each coil.

Referring to FIGS. 1 and 2, a coupling ring 20 is formed by a substantially cylindrical member having a slit 20b. This coupling ring 20 is made of a nonmagnetic material having spring characteristics, e.g., spring stainless steel or spring phosphor bronze. An inner surface 20a of the coupling ring 20 has a diameter smaller than the outer diameter of the outer magnetic pole portions of the first and second stators 18 and 19. When the outer magnetic pole portions of the first and second stators 18 and 19 are inserted in the inner surface 20a, the coupling ring 20 elastically deforms due to the slit 20b to elastically hold the first and second stators 18 and 19.

The first and second stators 18 and 19 are fixed with a phase shift of 180/n°(18° in this embodiment) such that their distal ends are spaced apart by a predetermined distance. That is, the distal ends of the first outer magnetic pole portions 18a, 18b, 18c, 18d, and 18e and the distal ends of the second outer magnetic pole portions 19a, 19b, 19c, 19d, and 19e are spaced apart by a predetermined distance in a direction parallel to the motor axis and face each other with a phase shift of 180/n°(18° in this embodiment). Since the first and second outer magnetic poles face each other, a magnetic flux runs smoothly between the magnetic poles. However, since the coupling ring 20 is made of a nonmagnetic material, the first and second stators 18 and 19 can be magnetically isolated from each other, thereby preventing the respective stators from magnetically influencing each other. This stabilizes the performance of the motor.

Figure 3A:
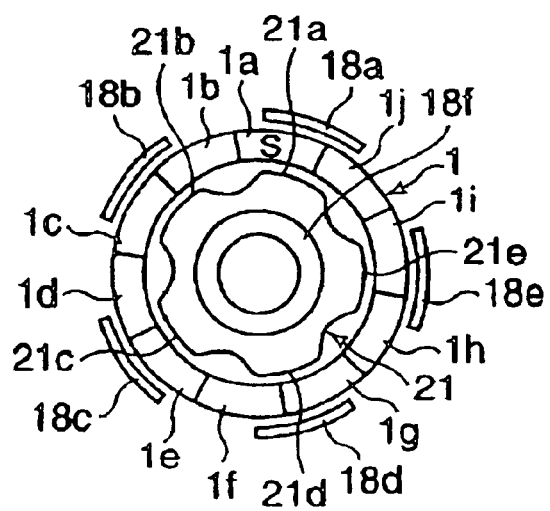
FIGS. 3A, 3B, 3C and 3D are sectional views, each of which is taken along a line A-A in FIG. 2, and shows a rotated state of a rotor.
Figure 3B:
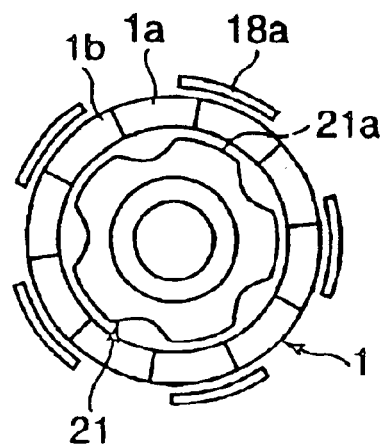
Figure 3C:
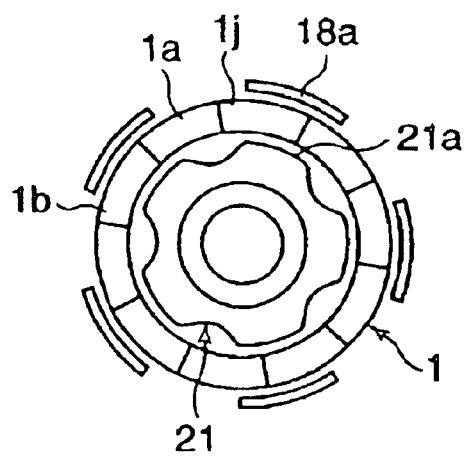
Figure 3D:
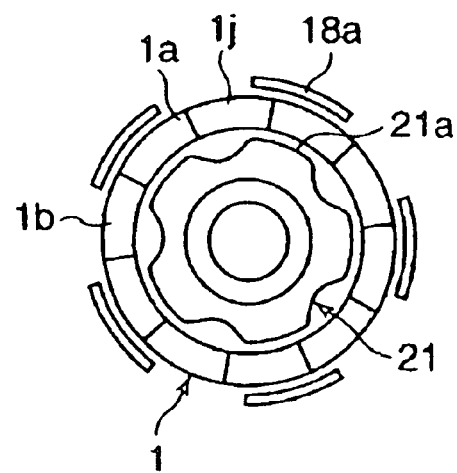
Figure 4A:
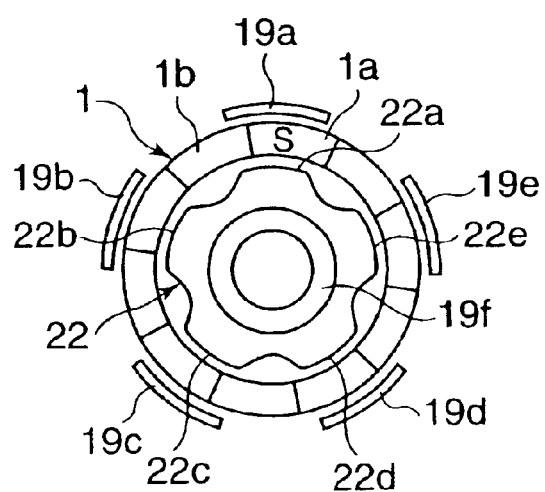
FIGS. 4A, 4B, 4C and 4D are sectional views, each of which is taken along a line B-B in FIG. 2, and shows a rotated state of the rotor.
Figure 4B:
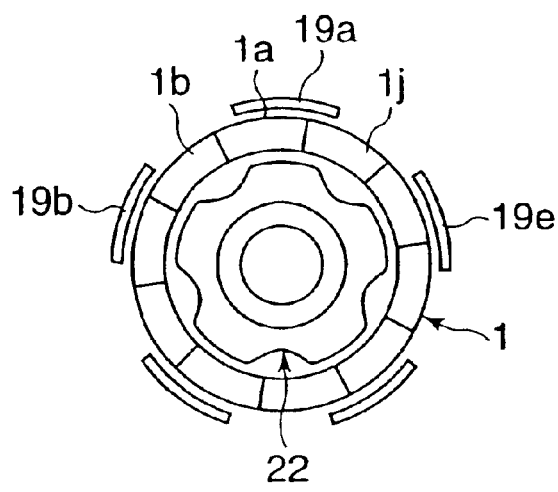
Figure 4C:
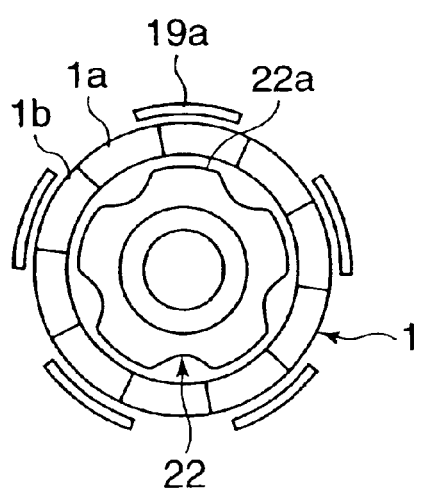
Figure 4D:
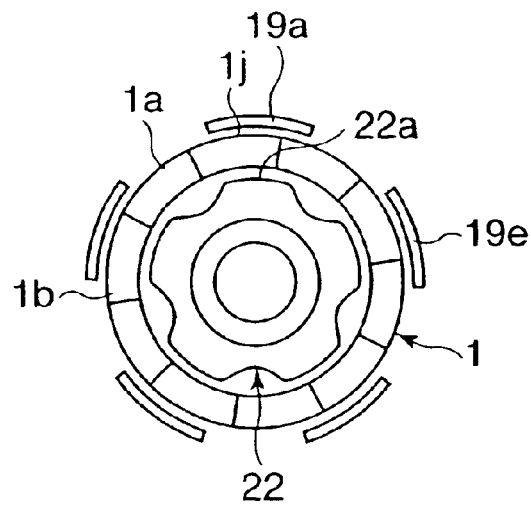

FIGS. 3A to 3D are sectional views, each of which is taken along a line A-A in FIG. 2, and shows a rotated state of the rotor. FIGS. 4A to 4D are sectional views, each of which is taken along a line B-B in FIG. 2, and shows a rotated state of the rotor. FIGS. 3A and 4A show states at the same point in time, and so do FIGS. 3B and 4B, FIGS. 3C and 4C, and FIGS. 3D and 4D, respectively. An illustration of the intermediate members 6 and 7 and coupling ring 20 is omitted from FIGS. 3A to 3D and FIGS. 4A to 4D.

Referring to FIGS. 3A to 3D and FIGS. 4A to 4D, the coils 4 and 5 are energized in the states shown in FIGS. 3A and 4A to magnetize the first outer magnetic pole portions 18a, 18b, 18c, 18d, and 18e to the S pole; the first inner magnetic pole portions 21a, 21b, 21c, 21d, and 21e to the N pole; the second outer magnetic pole portions 19a, 19b, 19c, 19d, and 19e to the N pole; and the second inner magnetic pole portions 22a, 22b, 22c, 22d, and 22e to the S pole. As a consequence, the magnet 1 serving as a rotor rotates counterclockwise by 18° to reach the states shown in FIGS. 3B and 4B.

The direction of the current supplied to the second coil 5 is then reversed to magnetize the first outer magnetic pole portions 18a, 18b, 18c, 18d, and 18e to the S pole; the first inner magnetic pole portions 21a, 21b, 21c, 21d, and 21e to the N pole; second outer magnetic pole portions 19a, 19b, 19c, 19d, and 19e to the S pole; and the second inner magnetic pole portions 22a, 22b, 22c, 22d, and 22e to the N pole. As a consequence, the magnet 1 serving as the rotor further rotates counterclockwise by 18° to reach the states shown in FIGS. 3C and 4C.

The direction of the current supplied to the first coil 4 is then reversed to magnetize the first outer magnetic pole portions 18a, 18b, 18c, 18d, and 18e to the N pole; the first inner magnetic pole portions 21a, 21b, 21c, 21d, and 21e to the S pole; the second outer magnetic pole portions 19a, 19b,19c, 19d, and 19e to the S pole; and the second inner magnetic pole portions 22a, 22b, 22c, 22d, and 22e to the N pole. As a consequence, the magnet 1 serving as the rotor further rotates counterclockwise by 18° to reach the states shown in FIGS. 3D and 4D. Subsequently, the energizing directions of the first and second coils 4 and 5 are sequentially switched in this manner to rotate the magnet 1 serving as the rotor to positions corresponding to energization phases.

A stepping motor having an arrangement like that described above is optimal for the realization of an ultra-compact motor. This will be described below. The basic arrangement of the stepping motor will be described first. First, the magnet has a hollow cylindrical shape. Second, the outer circumferential surface of the magnet is divided into n portions in the circumferential direction, and the n portions are alternately magnetized to different polarities. Third, the first and second coils are sequentially arranged in the axial direction of the magnet. Fourth, the outer and inner magnetic pole portions of the first and second stators excited by the first and second coils are opposed to the outer and inner circumferential surfaces of the magnet. Fifth, the outer magnetic pole portions are constituted by gaps and teeth extending in a direction parallel to the motor axis.

The outer diameter of this stepping motor may be large enough to make the magnetic poles of the stator face the outer surface of the magnet. The length of the stepping motor may be equal to the sum of the length of the magnet and the lengths of the first and second coils. For this reason, the size of the stepping motor is determined by the diameter and length of the magnet and each coil. If, therefore, the diameter and length of the magnet and each coil are greatly reduced, an ultra-compact stepping motor can be realized.

To greatly reduce the diameter and length of the magnet and each coil will make it difficult to maintain high precision for the stepping motor. However, by inserting an intermediate member having a hollow cylindrical shape between the inner circumferential surface of the magnet and the inner magnetic poles, the positional precision of the magnet in the radial direction can be ensured. In this case, if the inner circumferential surface of the magnet is divided in the circumferential direction and magnetized as well as the outer circumferential surface of the magnet, the output level of the motor can be further raised.

Figure 5:
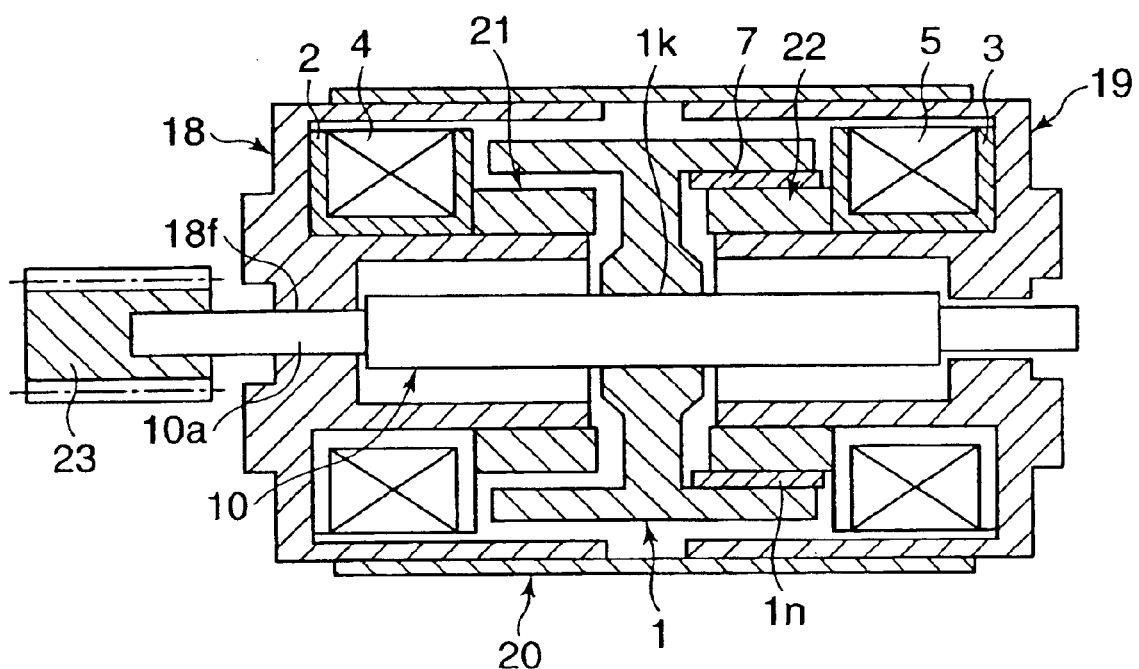
FIG. 5 is a view showing a modification of the motor in FIG. 2.

FIG. 5 is a modification of the motor in FIG. 2. Referring to FIG. 2, first and second intermediate members 6 and 7 are used. However, only one of the first intermediate member 6 and the second intermediate member 7 may be used. Referring to FIG. 5, only the second intermediate member 7 is used; the first intermediate member 6 (FIG. 2) is not used. Instead of the first intermediate member 6, a bearing portion 18f is formed on the first stator 18. A portion 10a of the output shaft 10 which is located closer to the left end portion rotatably fits and is supported in the bearing portion 18f. A pinion gear 23 is fixed to the left end portion of the output shaft 10. The modification shown in FIG. 5 differs from the first embodiment shown in FIGS. 1, 2, 3A to 3D, and 4A to 4D in the above points, but is substantially the same as the first embodiment in other arrangements. Note that the same reference numerals as in the first embodiment denote the same parts in this modification.

If the rotational output of the motor is to be transferred to another mechanism through the pinion gear 23 and the like, as in FIG. 5, the positional precision of the pinion gear 23 is important. If one end of the output shaft to which the pinion gear 23 and the like are attached is axially supported by the bearing portion 18f, and the other end is axially supported by the intermediate portion 7, at least the positional precision of the outer and inner magnetic pole portions of the second stator 19 can be ensured in the radial direction of the magnet. As in the first embodiment shown in FIGS. 1, 2, 3A to 3D, and 4A to 4D, therefore, motor characteristics in this modification can be stabilized in mass production.

Figure 6:
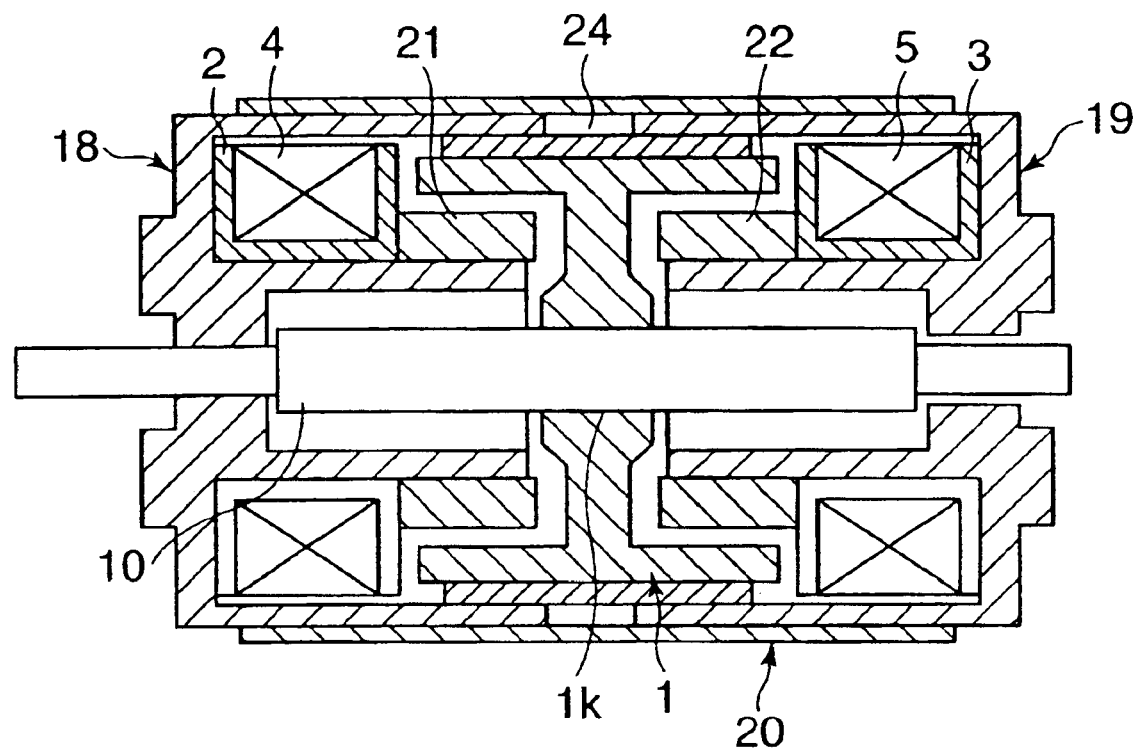
FIG. 6 is a view showing another modification of the motor in FIG. 2.

FIG. 6 shows another modification of the motor in FIG. 2. Referring to FIG. 6, the outer circumferential surface (outer surface) of the magnet 1 (the rotor) is rotatably held by a third intermediate member 24 having a hollow cylindrical shape. As shown in FIG. 6, the third intermediate member 24 having a hollow cylindrical shape rotatably fits in the inner surfaces of the first outer magnetic pole portions 18a, 18b, 18c, 18d, and 18e and second outer magnetic pole portions 19a, 19b, 19c, 19d, and 19e. The inner surface (inner circumferential surface) of the third intermediate member 24 rotatably fits on the outer surface (outer circumferential surface) of the magnet 1. The magnet 1 is rotatably held by the third intermediate member 24. Note that an illustration of members corresponding to the first and second intermediate members 6 and 7 in FIGS. 2 and 5 is omitted from FIG. 6.

The motor shown in FIG. 6 differs from the motor shown in FIGS. 2 and 5 in the above points, but is substantially the same in other respects. The same reference numerals as in FIGS. 2 and 5 denote the same parts in FIG. 6, and a detailed description thereof is omitted here. According to this motor, the gap between the outer circumferential surface of the magnet 1 and the first outer magnetic pole portions 18a, 18b, 18c, 18d, and 18e or the second outer magnetic pole portions 19a, 19b, 19c, 19d, and 19e is defined by only the thickness of the third cylindrical intermediate member 24. Therefore, the positional precision in the radial direction of the magnet can be maintained high, and the motor characteristics can be stabilized in mass production.

According to the arrangement shown in FIG. 6, the third intermediate member 24 rotatably fits in the inner surfaces of the first outer magnetic pole portions 18a, 18b, 18c, 18d, and 18e and the inner surfaces of the second outer magnetic pole portions 19a, 19b, 19c, 19d, and 19e of both stators (18, 19). However, the third intermediate member 24 may be rotatably fitted on the inner surfaces of the outer magnetic pole portions of only one of the first and second stators 18 and 19. With this arrangement as well, the same effect as that described above can be obtained.

A motor of the above type has a shaft in its center. For this reason, when this motor is used in the lens barrel of a camera, the motor must be positioned to be parallel to the optical axis. If the motor is to be used to drive aperture blades, a shutter, a lens, or the like, the radial size of the lens barrel is equal to the sum of the radius of the lens or the radial size of the stop aperture and the diameter of the motor.

Figure 7:
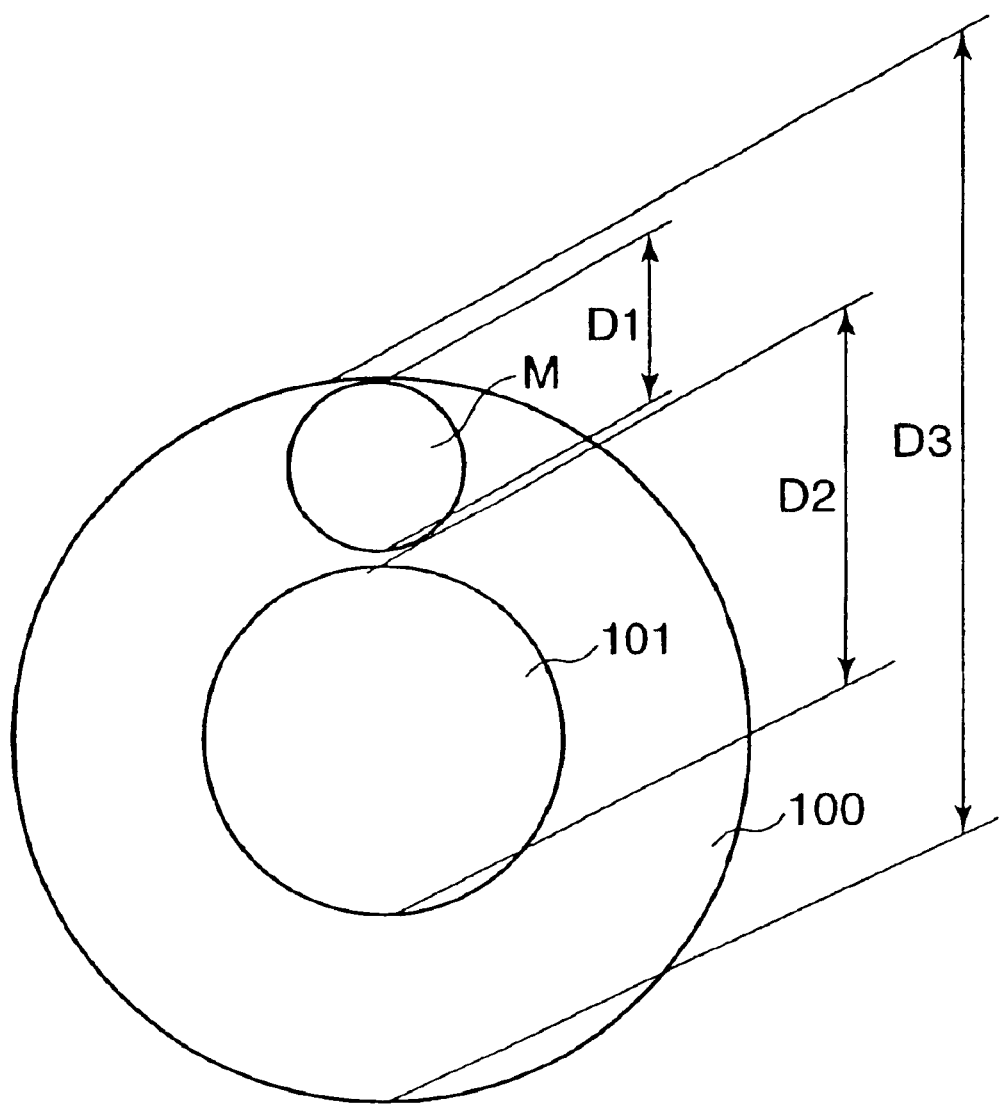
FIG. 7 is a plan view showing the sizes of the motor in FIG. 1 and a lens barrel base plate or light amount adjusting apparatus.

FIG. 7 shows this state. Letting D1 be the diameter of a motor M, D2 be the diameter of an aperture portion 101, and D3 be the diameter of a lens barrel base plate or light amount adjusting apparatus 100, the diameter D3 of the lens barrel base plate 100 becomes at least (2×D1+D2). For such an application purpose, a doughnut-shaped motor with a small size in the radial direction is required. In addition, it is also required that a lens barrel unit or light amount adjusting apparatus be reduced in size. When, therefore, this motor is to be used for the lens barrel of a camera, there is room for improvement in optimizing the motor for this usage form.

For example, Japanese Patent Application Laid-Open Nos. 53-37745 and 57-166847 disclose mechanisms for driving aperture blades using hollow doughnut-shaped motors. Since each of these motors is formed by winding a coil around a hollow magnet, the overall thickness of the coil, the thickness of the magnet, and the thickness of the stator add up in the radial direction. Therefore, the thickness of such a doughnut-shaped motor in the radial direction cannot be sufficiently reduced. In addition, a mechanism for driving a lens is disclosed in Japanese Utility Model Application Laid-Open No. 56-172827 or the like. According to this mechanism, since the central axis of a coil is positioned in a direction so as to extend toward the optical axis center of a lens barrel, the coil shape and assembly become complicated, resulting in an increase in the number of parts. This makes it impossible to realize a compact apparatus.

A motor that ensures position precision in the radial direction of a magnet and has a doughnut shape will be described below. The shape of this motor is very suitable as a driving source for driving a lens.

(Second Embodiment)

Figure 8:
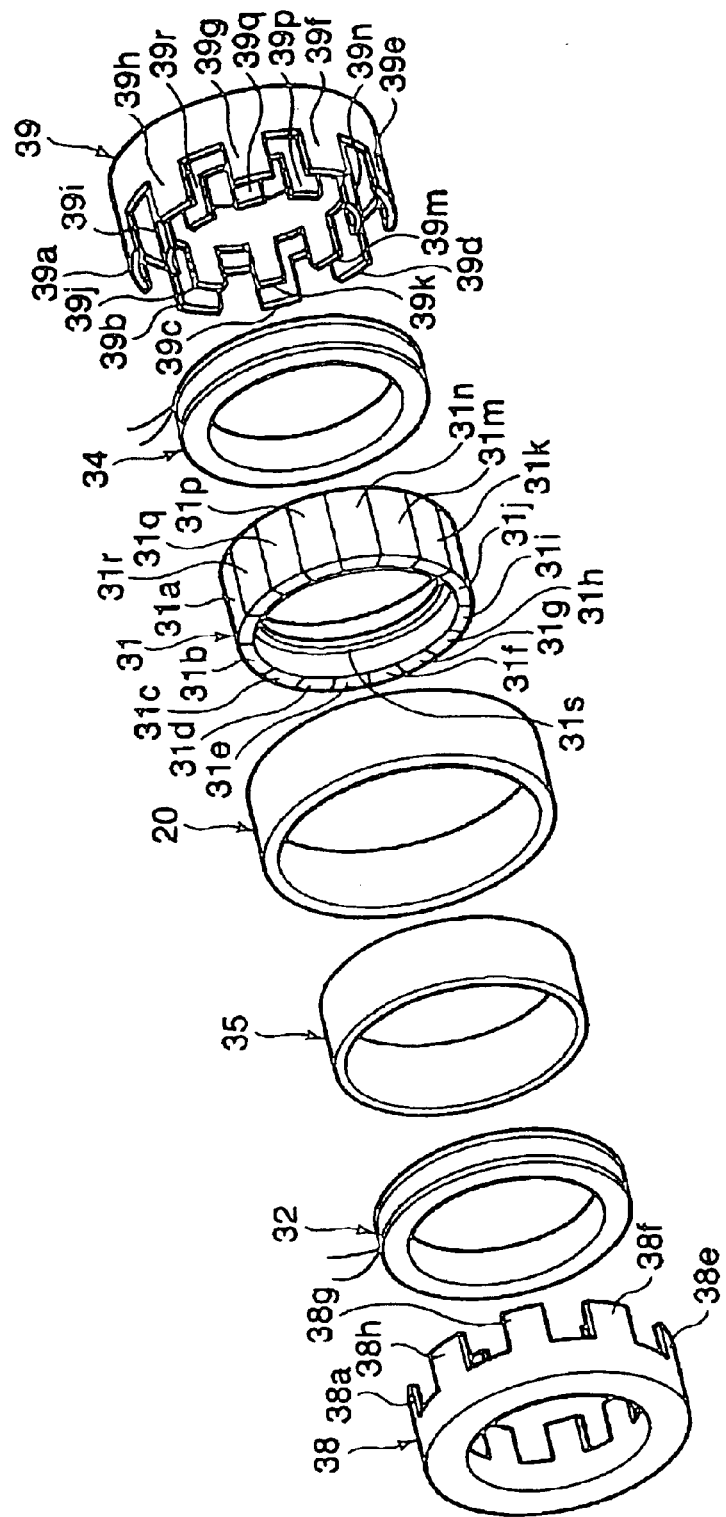
FIG. 8 is an exploded perspective view of a motor according to the second embodiment.
Figure 9:
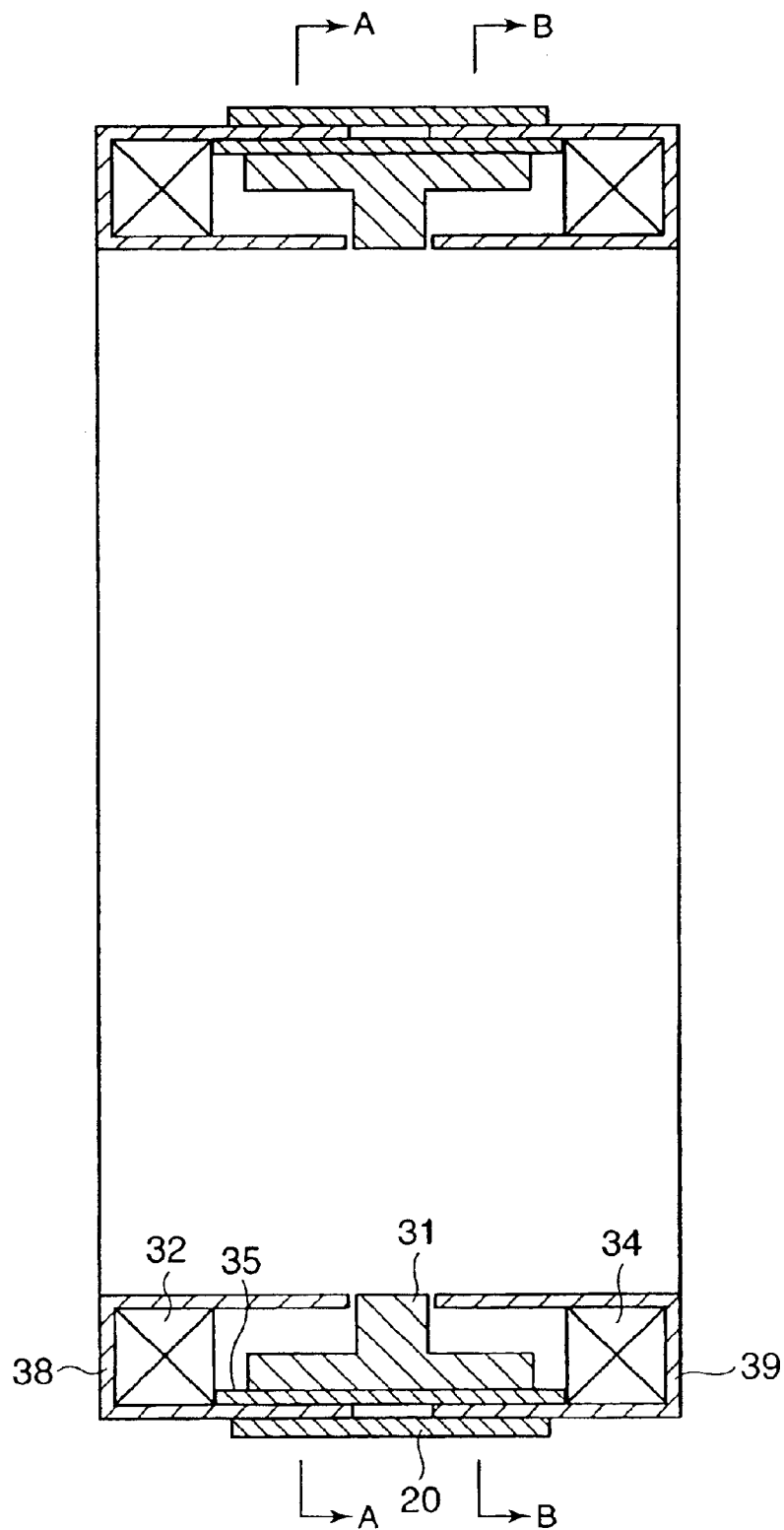
FIG. 9 is a longitudinal sectional view of the motor in FIG. 8 in the axial direction after assembly.

FIG. 8 is an exploded perspective view schematically showing the structure of the second embodiment. FIG. 9 is a longitudinal sectional view of the central portion of a motor in FIG. 8. FIGS. 10A to 10D are schematic sectional views taken along a line A-A in FIG. 9. FIGS. 11A to 11D are schematic sectional views taken along a line B-B in FIG. 9. The second embodiment shown in FIGS. 8, 9, 10A to 10D and 11A through 11D is a motor forming an actuator and having a hollow cylindrical shape (doughnut shape). This motor does not have a member equivalent to the output shaft 10 in the first embodiment.

Referring to FIGS. 8, 9, 10A to 10D and 11A through 11D, a cylindrical magnet 31 has a rotor. The outer circumferential surface of this magnet 31 is divided into n portions (16 portions in this embodiment) in the circumferential direction, which are alternately magnetized to the S and N poles to form magnetized portions 31a, 31b, 31c, 31d, 31e, 31f, 31g, 31h, 31i, 31j, 31k, 31l, 31m, 31n, 31p, 31q, and 31r. If, therefore, the magnetized portions 31a, 31c, 31e, 31g, 31i, 31k, 31n, and 31q are magnetized to the S pole, the magnetized portions 31b, 31d, 31f, 31h, 31j, 31m, 31p, and 31r are magnetized to the N pole.

The magnet 31 is made of a plastic magnet material by injection molding. As in the first embodiment, the thickness of this magnet in the radial direction of the cylindrical shape can be greatly reduced. The inner circumferential surface of the magnet 31 has a weak magnetization distribution as compared with the outer circumferential surface or is not magnetized at all. Alternatively, the inner circumferential surface is magnetized to the opposite polarity as the outer circumferential surface. That is, if a given portion of the outer circumferential surface is magnetized to the S pole, the corresponding portion of the inner circumferential surface is magnetized to the N pole. A rib portion (an annular rib portion extending from the inner surface toward the center) 31s having a small inner diameter is formed at the central portion of the magnet 31 in the axial direction. This motor also has a first coil 32 and second coil 34. The first and second coils 32 and 34 are concentric with respect to the magnet 31, and are positioned to sandwich the magnet 31 in the axial direction. The outer diameter of the first and second coils 32 and 34 is almost equal to that of the magnet 31.

Referring to FIGS. 8, 9, 10A to 10D and 11A through 11D, a first stator 38 is made of a soft magnetic material. This first stator 38 has an outer cylinder and an inner cylinder having a hollow columnar shape. In this embodiment, the outer and inner magnetic poles are gapped from the distal ends of the cylindrical portions in the axial direction to form a plurality of teeth. With this process, a plurality of magnetic pole portions in the shape of comb teeth are formed in the circumferential direction. In the first embodiment, only the outer magnetic pole is formed into the shape of comb teeth. In this embodiment, the inner magnetic pole also has the same arrangement. The distal end portion of the outer cylinder of the first stator 38 is formed into (n/2), i.e., eight, first outer magnetic pole portions 38a, 38b, 38c, 38d, 38e, 38f, 38g, and 38h which face the outer circumferential surface of the magnet 31. The distal end portion of the inner cylinder of the first stator 38 is formed into (n/2), i.e., eight, first inner magnetic pole portions 38i, 38j, 38k, 38m, 38n, 38p, 38q, and 38r which face the inner circumferential surface of the magnet 31. The first outer magnetic pole portions 38a, 38b, 38c, 38d, 38e, 38f, 38g, and 38h and first inner magnetic pole portions 38i, 38j, 38k, 38m, 38n, 38p, 38q, and 38r are formed in phase with each other on two sides of the magnet 31. Each magnetic pole portion is formed with a shift of an integer multiple of 360/(n/2)°, i.e., an integer multiple of 45°, so as to be in phase with the magnetization phase of a corresponding portion of the magnet 31.

A second stator 39 has an arrangement similar to that of the first stator. The second stator 39 is made of a soft magnetic material. This second stator 39 has an outer cylinder and an inner cylinder having a hollow columnar shape. The distal end portion of the outer cylinder of the second stator 39 is formed into (n/2), i.e., eight, second outer magnetic pole portions 39a, 39b, 39c, 39d, 39e, 39f, 39g, and 39h which face the outer circumferential surface of the magnet 31. The distal end portion of the inner cylinder of the second stator 39 is formed into (n/2), i.e., eight, second inner magnetic pole portions 39*i*, 39*j*, 39*k*, 39*m*, 39*n*, 39*p*, 39*q*, and 39*r* which face the inner circumferential surface of the magnet 31. The second outer magnetic pole portions 39*a*, 39*b*, 39*c*, 39*d*, 39*e*, 39*f*, 39*g*, and 39*h* and second inner magnetic pole portions 39*i*, 39*j*, 39*k*, 39*m*, 39*n*, 39*p*, 39*q*, and 39*r* are formed on two sides of the magnet 31 to be in phase with each other. Each magnetic pole portion is formed with a shift of an integer multiple of 360/(n/2)°, i.e., an integer multiple of 45°, so as to be in phase with the magnetization phase of a corresponding portion of the magnet 31.

The first outer magnetic pole portions 38*a*, 38*b*, 38*c*, 38*d*, 38*e*, 38*f*, 38*g*, and 38*h* and second outer magnetic pole portions 39*a*, 39*b*, 39*c*, 39*d*, 39*e*, 39*f*, 39*g*, and 39*h* are constituted by gaps and teeth extending in a direction parallel to the motor axis. With this arrangement, magnetic poles can be formed while the diameter (outer size) of the motor is minimized. If outer magnetic pole portions are formed by radial recesses/projections, the diameter of the motor increases accordingly. However, since the outer magnetic pole portions are constituted by the gaps and teeth extending in a direction parallel to the motor axis, the diameter of the motor can be limited to a small value.

The first outer magnetic pole portions 38*a*, 38*b*, 38*c*, 38*d*, 38*e*, 38*f*, 38*g*, and 38*h* and second outer magnetic pole portions 39*a*, 39*b*, 39*c*, 39*d*, 39*e*, 39*f*, 39*g*, and 39*h* oppose each other and the phases (the angular positions of the magnetic pole portions in the circumferential direction) are shifted from each other by 180/n°, i.e., 11.25°. In addition, the first inner magnetic pole portions 38*i*, 38*j*, 38*k*, 38*m*, 38*n*, 38*p*, 38*q*, and 38*r* and second inner magnetic pole portions 39*i*, 39*j*, 39*k*, 39*m*, 39*n*, 39*p*, 39*q*, and 39*r* sandwich the rib portion 31*s* of the magnet.

The first outer magnetic pole portions 38*a*, 38*b*, 38*c*, 38*d*, 38*e*, 38*f*, 38*g*, and 38*h* and first inner magnetic pole portions 38*i*, 38*j*, 38*k*, 38*m*, 38*n*, 38*p*, 38*q*, and 38*r* are formed (arranged) to face the outer and inner circumferential surfaces of one end of the magnet 31 and sandwich one end of the magnet 31. The second outer magnetic pole portions 39*a*, 39*b*, 39*c*, 39*d*, 39*e*, 39*f*, 39*g*, and 39*h* and second inner magnetic pole portions 39*i*, 39*j*, 39*k*, 39*m*, 39*n*, 39*p*, 39*q*, and 39*r* are formed (arranged) to face the outer and inner circumferential surfaces of the other end of the magnet 31 and sandwich the other end of the magnet 31.

The first coil 32 is wound between the outer and inner cylinders of the first stator 38. The second coil 34 is wound between the outer and inner cylinders of the second stator 39. When the first coil 32 is energized, the first outer magnetic pole portions and first inner magnetic pole portions are excited. When the second coil 34 is magnetized, the second outer magnetic pole portions and second inner magnetic pole portions are excited.

As in the first embodiment, therefore, the magnetic flux generated at the magnetic pole portions effectively acts on the magnet 31, serving as a rotor, to raise the output level of the motor. In addition, this makes it possible to attain a reduction in power consumption (savings) and a reduction in coil size.

A coupling ring 20 is formed by a cylindrical member. This coupling ring 20 is made of a nonmagnetic material, e.g., a plastic material, spring stainless steel, or spring phosphor bronze. The coupling ring 20 is used to hold and fix the first and second stators 38 and 39 while their phases are shifted from each other by 180/n°, i.e., 11.25°, and the distal ends of the respective stators are spaced apart from each other by a given distance. Since the coupling ring 20 is made of a nonmagnetic material, the first and second stators 38 and 39 can be magnetically isolated from each other, thereby preventing the respective stators from magnetically influencing each other. This stabilizes the performance of the motor.

The rib portion 31*s* formed on the inner circumferential surface of the magnet 31 is regulated by the distal end portions of the inner magnetic pole portions 38*i*, 38*j*, 38*k*, 38*m*, 38*n*, 38*p*, 38*q*, and 38*r* of the first stator 38 and the distal end portions of the inner magnetic pole portions 39*i*, 39*j*, 39*k*, 39*m*, 39*n*, 39*p*, 39*q*, and 39*r* of the second stator 39.

Referring to FIGS. 8, 9, 10A to 10D and 11A through 11D, the outer circumferential surface (outer surface) of the magnet 31, serving as the rotor, is rotatably held by a fourth intermediate member 35 having a hollow cylindrical shape. The outer circumferential surface of the fourth intermediate member 35 having the hollow cylindrical shape rotatably fits in the inner surfaces of the first outer magnetic pole portions 38*a*, 38*b*, 38*c*, 38*d*, 38*e*, 38*f*, 38*g*, and 38*h* of the first stator 38 and the inner surfaces of the second outer magnetic pole portions 39*a*, 39*b*, 39*c*, 39*d*, 39*e*, 39*f*, 39*g*, and 39*h* of the second stator 39. The inner circumferential surface of the fourth intermediate member 35 rotatably fits on the outer circumferential surface of the magnet 31. The magnet 31 is rotatably held (axially supported) by the fourth intermediate member 35.

The operation of this stepping motor will be described next with reference to FIGS. 10A to 10D and FIGS. 11A to 11D.

Figure 10A:
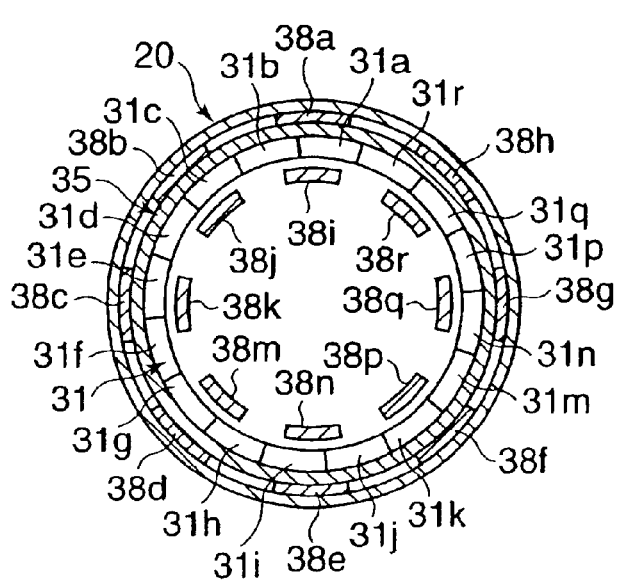
FIGS. 10A, 10B, 10C and 10D are sectional views, each of which is taken along a line A-A in FIG. 9, and shows a rotated state of a rotor.
Figure 10B:
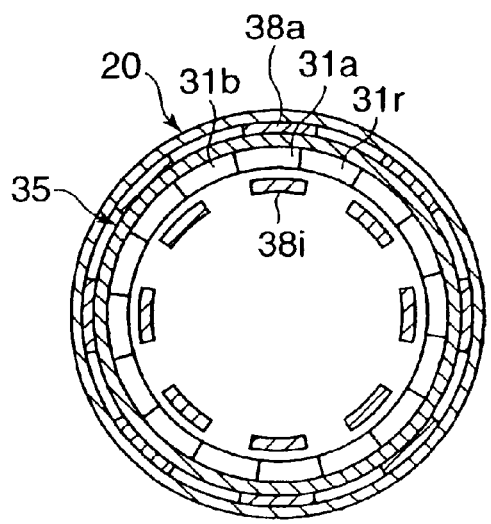
Figure 10C:
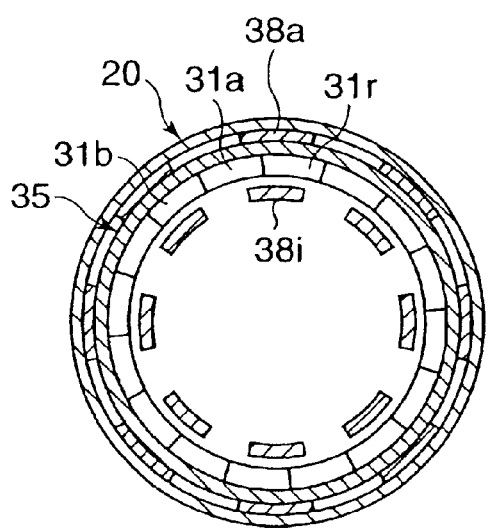
Figure 10D:
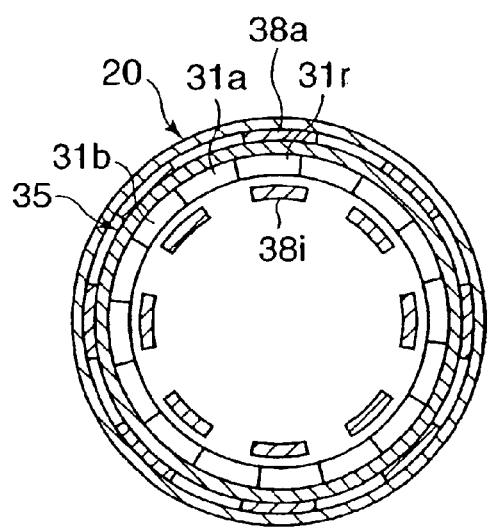
Figure 11A:
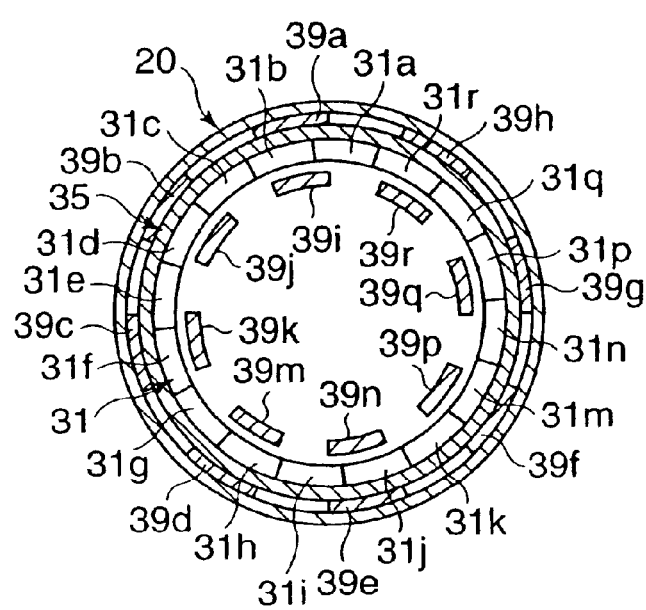
FIGS. 11A, 11B, 11C and 11D are sectional views, each of which is taken along a line B-B in FIG. 9, and shows a rotated state of the rotor.
Figure 11B:
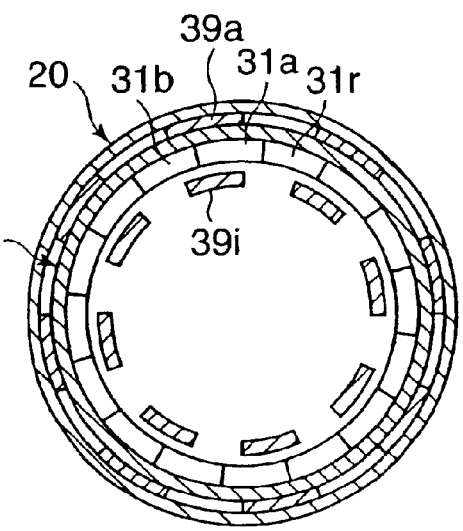
Figure 11C:
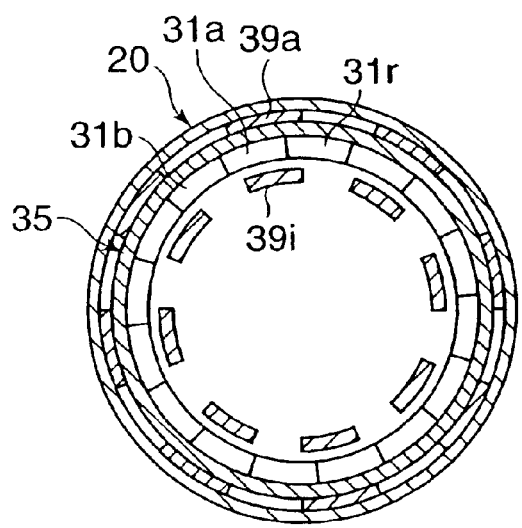
Figure 11D:
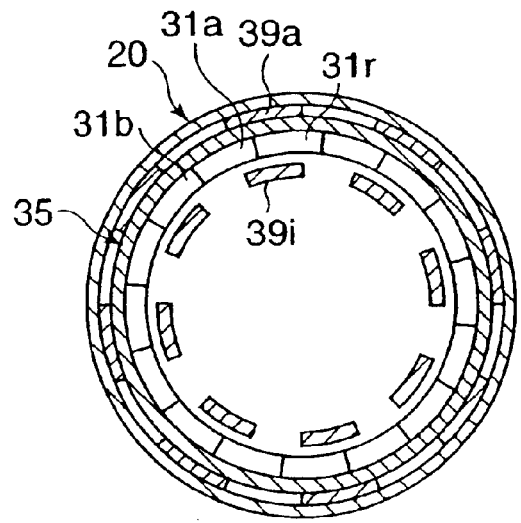

The first and second coils 32 and 34 are energized in the states shown in FIGS. 10A and 11A to magnetize the first outer magnetic pole portions 38*a*, 38*b*, 38*c*, 38*d*, 38*e*, 38*f*, 38*g*, and 38*h* to the N pole; the first inner magnetic pole portions 38*i*, 38*j*, 38*k*, 38*m*, 38*n*, 38*p*, 38*q*, and 38*r* to the S pole; the second outer magnetic pole portions 39*a*, 39*b*, 39*c*, 39*d*, 39*e*, 39*f*, 39*g*, and 39*h* to the N pole; and the second inner magnetic pole portions 39*i*, 39*j*, 39*k*, 39*m*, 39*n*, 39*p*, 39*q*, and 39*r* to the S pole. As a consequence, the magnet 31, serving as the rotor, rotates counterclockwise by 11.25° to reach the states shown in FIGS. 10B and 11B.

The first coil 32 is then energized in the reverse direction to magnetize the first outer magnetic pole portions 38*a*, 38*b*, 38*c*, 38*d*, 38*e*, 38*f*, 38*g*, and 38*h* to the S pole; the first inner magnetic pole portions 38*i*, 38*j*, 38*k*, 38*m*, 38*n*, 38*p*, 38*q*, and 38*r* to the N pole; the second outer magnetic pole portions 39*a*, 39*b*, 39*c*, 39*d*, 39*e*, 39*f*, 39*g*, and 39*h* to the N pole; and the second inner magnetic pole portions 39*i*, 39*j*, 39*k*, 39*m*, 39*n*, 39*p*, 39*q*, and 39*r* to the S pole. As a consequence, the magnet 31, serving as the rotor, rotates counterclockwise by 11.25° to reach the states shown in FIGS. 10C and 11C.

The second coil 34 is then energized in the reverse direction to magnetize the first outer magnetic pole portions 38*a*, 38*b*, 38*c*, 38*d*, 38*e*, 38*f*, 38*g*, and 38*h* to the S pole; the first inner magnetic pole portions 38*i*, 38*j*, 38*k*, 38*m*, 38*n*, 38*p*, 38*q*, and 38*r* to the N pole; the second outer magnetic pole portions 39*a*, 39*b*, 39*c*, 39*d*, 39*e*, 39*f*, 39*g*, and 39*h* to the S pole; and the second inner magnetic pole portions 39*i*, 39*j*, 39*k*, 39*m*, 39*n*, 39*p*, 39*q*, and 39*r* to the N pole. As a consequence, the magnet 31, serving as the rotor, rotates counterclockwise by 11.25° to reach the states shown in FIGS. 10D and 11D. Subsequently, the current directions to the coils 32 and 34 are sequentially switched in this manner so as to rotate the magnet 31, serving as the rotor, to positions corresponding to the current phases.

According to the second embodiment described with reference to FIGS. 8, 9, 10A to 10D and 11A through 11D, the gap between the outer circumferential surface of the magnet 31 and the first outer magnetic pole portions 38a, 38b, 38c, 38d, 38e, 38f, 38g, and 38h or second outer magnetic pole portions 39a, 39b, 39c, 39d, 39e, 39f, 39g, and 39h is defined by only the thickness of the fourth intermediate member 35. Therefore, this gap can be maintained with high precision, and the characteristics and performance of a motor can be stabilized in mass production. That is, in the second embodiment as well, the same effect as that of the first embodiment can be obtained. In addition, according to this embodiment, since the magnet 31 can be rotatably held by the hollow structure, a hollow doughnut-shaped motor can be formed. This makes it possible to form an actuator having a small size in the radial direction. Consequently, a motor can be obtained, which has an optimal arrangement as an actuator that is mounted in the lens barrel of a camera and drives a shutter blade or aperture lens.

The fourth intermediate member 35 rotatably fits in the inner surfaces of the outer magnetic pole portions of both the first and second stators 38 and 39. However, the fourth intermediate member 35 may be rotatably fitted in the inner surfaces of the outer magnetic pole portions of only one of the stators. With this arrangement as well, the same effect as that described above can be obtained.

In addition, when the motor of this embodiment is used for a light amount adjusting apparatus, the hollow portion can be positioned as an optical path. Therefore, the size of the light amount adjusting apparatus can be as small as approximately (magnet thickness+inner magnetic poles+outer magnetic poles)×2+D2.

(Third Embodiment)

FIGS. 12, 13, 14A, 14B and 15 are views showing the third embodiment.

Figure 12:
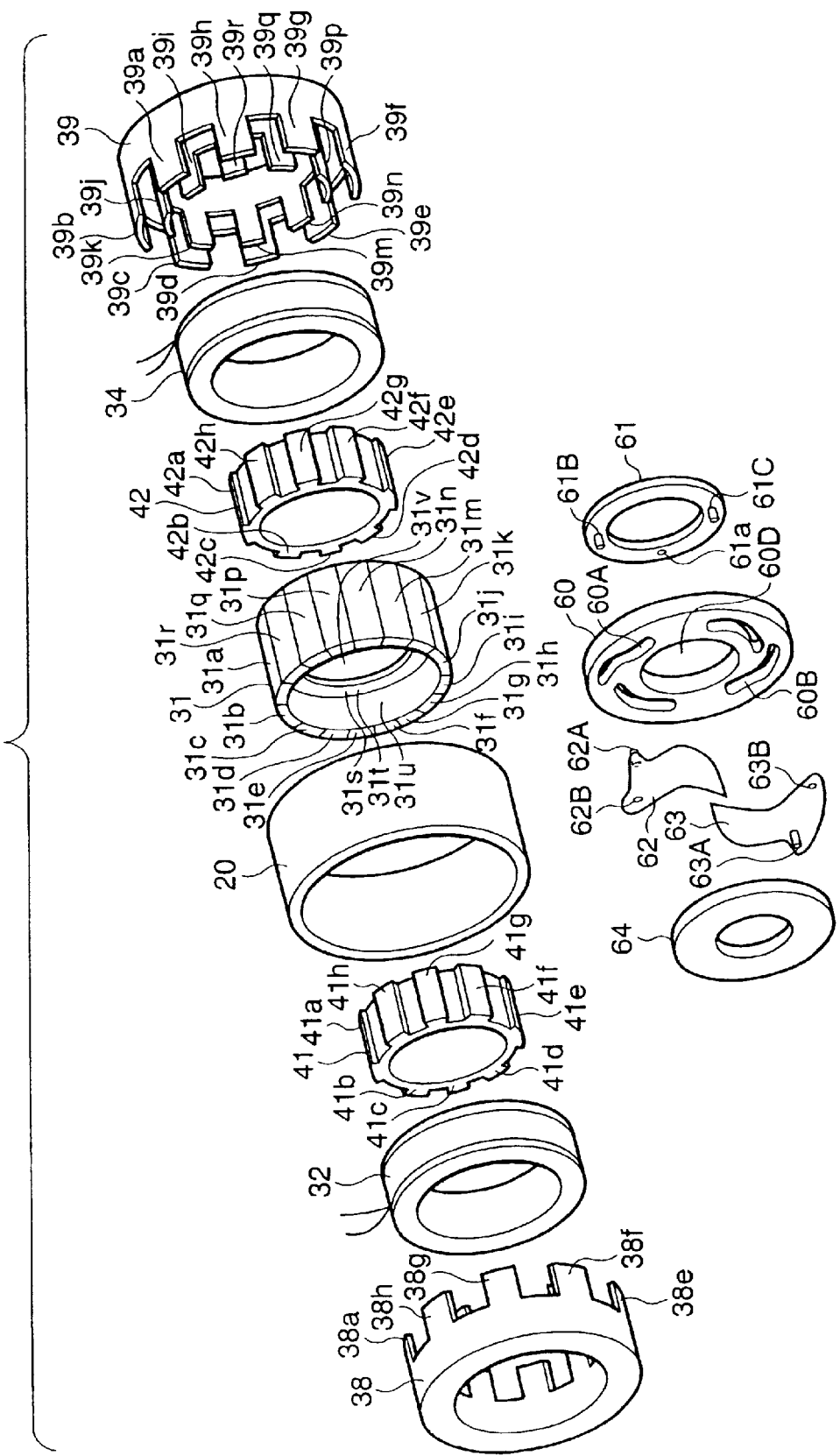
FIG. 12 is an exploded perspective view of a motor according to the third embodiment.
Figure 13:
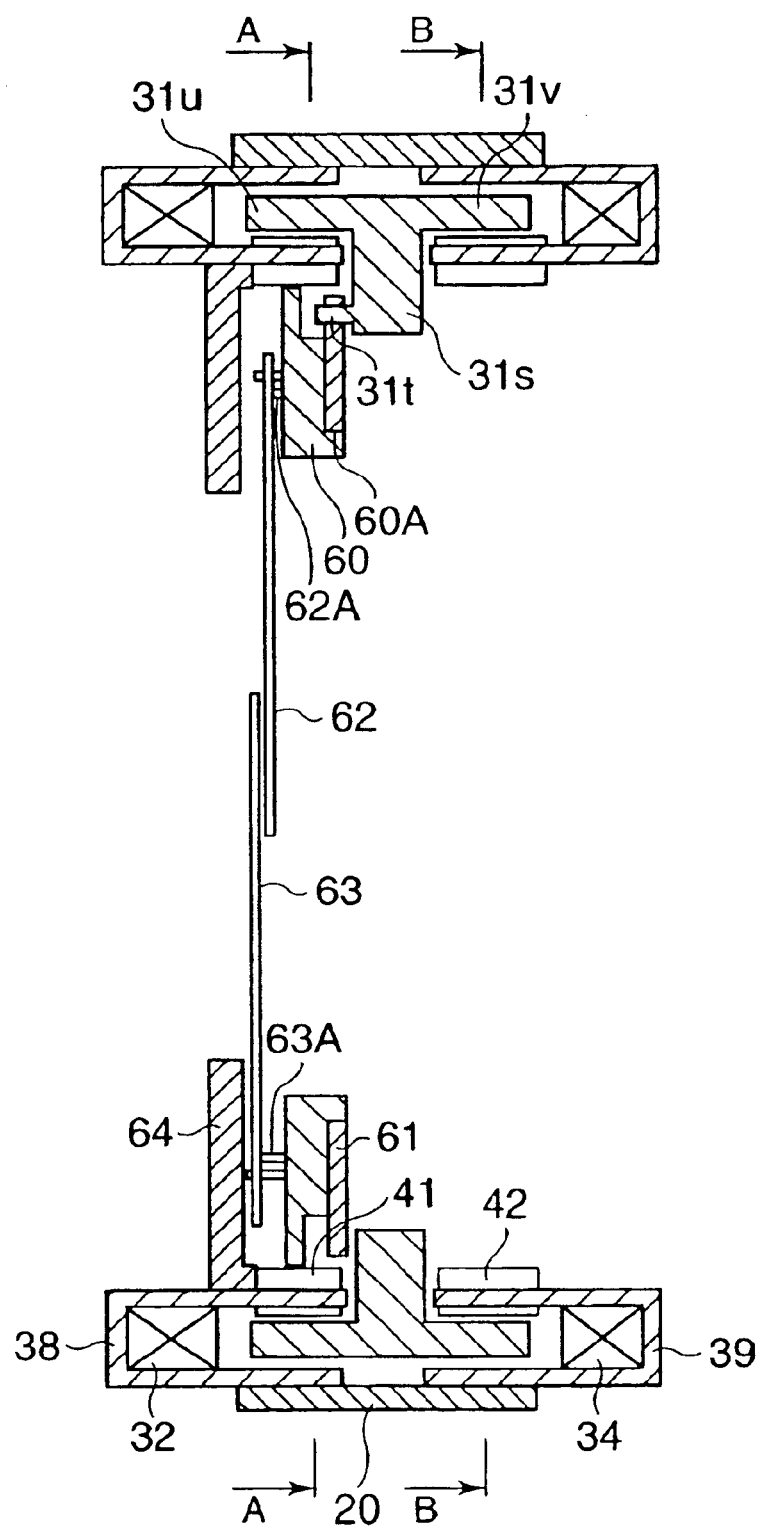
FIG. 13 is a longitudinal sectional view of the motor in FIG. 12 in the axial direction after assembly.
Figure 14A:
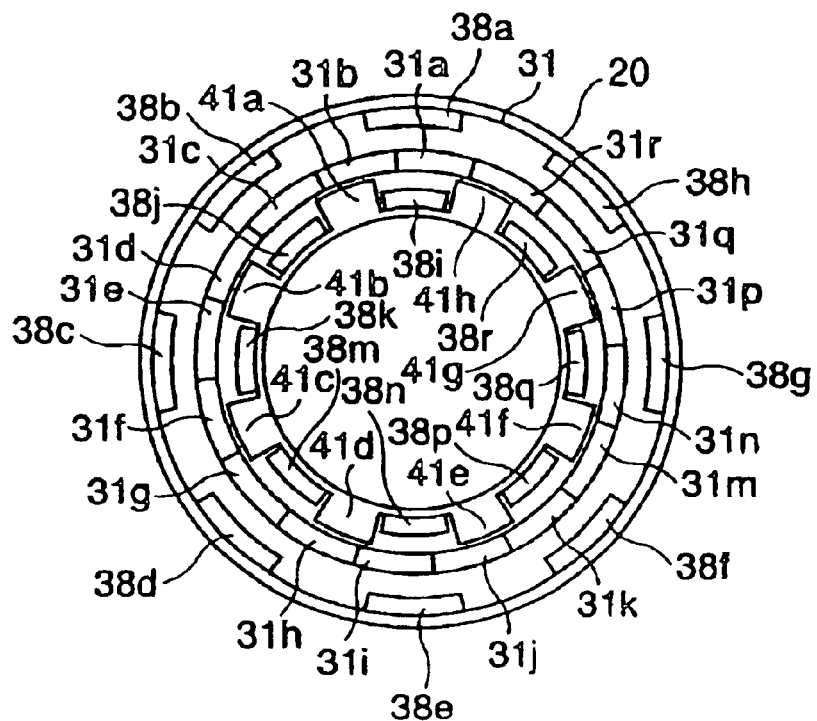
FIGS. 14A and 14B are sectional views, which are respectively taken along lines A-A and B-B in FIG. 13, and show rotated states of a rotor.
Figure 14B:
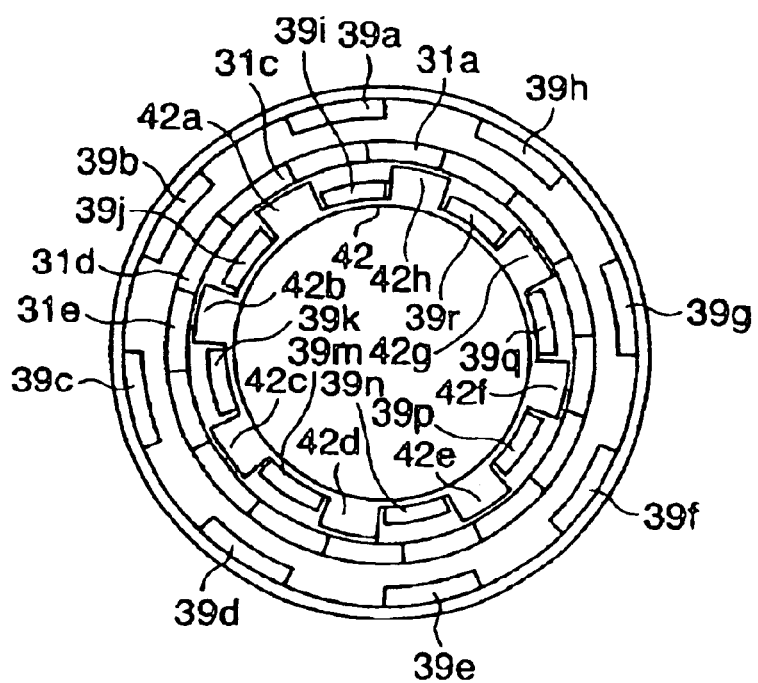

FIG. 12 is an exploded perspective view of a light amount adjusting apparatus. FIG. 13 is a sectional view of the light amount adjusting apparatus. FIGS. 14A and 14B are schematic sectional views respectively taken along lines A-A and B-B in FIG. 13.

Referring to FIGS. 12, 13, 14A and 14B, a first stator 38, second stator 39, first coil 32, second coil 34, and coupling ring 20 have substantially the same arrangements as those of the second embodiment. The same reference numerals as the second embodiment denote the same parts in the third embodiment, and a detailed description thereof will be omitted here.

A magnet 31 in this embodiment is the same as that in the second embodiment in that a rib portion 31s having a small diameter is formed on a central portion in the axial direction. In this embodiment, the rib portion 31s has a pin 31t.

This apparatus further includes a first hollow fitting member 41 fitted in the first inner magnetic pole portions and a second hollow fitting member 42 fitted in the second inner magnetic pole portions.

The first hollow fitting member 41 is fixed in the inner cylinder of the first stator 38. The first hollow fitting member 41 has a plurality of projections extending outwardly in the radial direction. These projections are formed in the same number as that of comb teeth serving as inner magnetic poles. The number of projections may be smaller than that of inner magnetic poles. However, these projections are preferably arranged at equal intervals in the circumferential direction. Projections 41a, 41b, 41c, 41d, 41e, 41f, 41g, and 41h fit between inner magnetic poles 38i, 38j, 38k, 38m, 38n, 38p, 38q, and 38r. These projections are slidably fitted in an inner circumferential surface 31u of the magnet 31. The first hollow fitting member 41 has a hollow structure.

The second hollow fitting member 42 is fixed in the inner cylinder of the second stator 39. The second hollow fitting member 42 has a plurality of projections extending outwardly in the radial direction. These projections are formed in the same number as that of comb teeth, serving as inner magnetic poles. The number of projections may be smaller than that of inner magnetic poles. However, these projections are preferably arranged at equal intervals in the circumferential direction. Projections 42a, 42b, 42c, 42d, 42e, 42f, 42g, and 42h fit between inner magnetic poles 39i, 39j, 39k, 39m, 39n, 39p, 39q, and 39r. These projections are slidably fitted in the inner circumferential surface 31v of the magnet 31. The second hollow fitting member 42 also has a hollow structure.

The movement of the rib portion 31s of the magnet 31 in the thrust direction is regulated by the first and second hollow fitting member 41 and 42. The magnet 1 is rotatably held by this structure.

Since the first and second hollow fitting members 41 and 42 slidably move on the inner circumferential surface of the magnet, the magnet can be rotated while its positional precision in the radial direction is maintained high. In addition, since the magnet is rotatably held by the first and second hollow fitting members 41 and 42, no output shaft for axially supporting the motor is required. This makes it possible to realize a doughnut-shaped hollow motor. Therefore, this motor is suitably used for a lens driving apparatus or the like having a hollow portion as an optical axis.

A case where this motor is mounted in a stop driving apparatus will be described below.

This apparatus includes a base plate 60 and an output ring 61 rotatably mounted on the base plate 60. The base plate 60 has an aperture portion 60D. A hole 61a of the output ring 61 receives the pin 31t of the magnet 31. The output ring 61 is therefore regulated in the rotating direction by the magnet and rotates together with the magnet 31.

Aperture blades 62 and 63 respectively have dowel pins 62A and 63A and hole portion 62B and 63B. The dowel pins 62A and 63A slidably fit in cam grooves 60A and 60B formed in the base plate 60, and the hole portion 62B and 63B rotatably receive dowel pins 61B and 61C of the output ring 61. As the output ring 61 rotates, the aperture blades 62 and 63 rotate about the optical axis and change the aperture amount. A blade press plate 64 is attached to the inner surface of the first stator 38. The blade press plate 64 and base plate 60 form a space in which the aperture blades 62 and 63 can move.

FIGS. 14A and 14B are schematic sectional views respectively taken along lines A-A and B-B in FIG. 13. An illustration of parts that are not necessary for the description of the operation of the motor, such as the aperture blades and output ring, is omitted from FIGS. 14A and 14B. The driving principle of the motor of this embodiment is the same as that of the second embodiment, and hence a description thereof will be omitted here.

As described above, the hole 61a of the output ring 61 receives the pin 31t of the magnet 31 so that the output ring 61 rotates together with the magnet 31. The magnet 31 is sequentially rotated by sequentially switching the energizing directions of the first and second coils 32 and 34.

Figure 15:
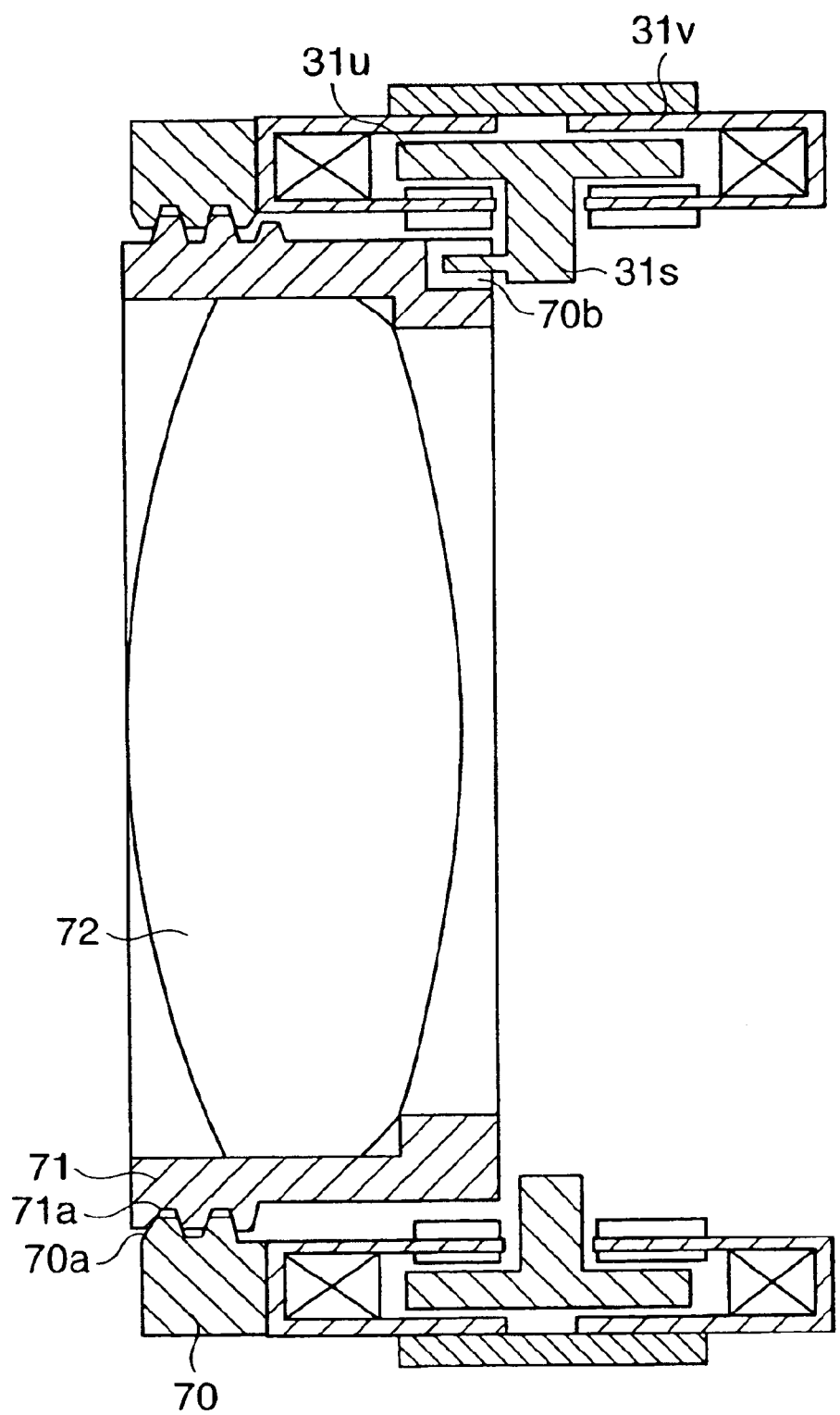
FIG. 15 is a view showing a modification of the motor in FIG. 12.

FIG. 15 shows a modification of the third embodiment. The above motor is used as a driving source for a lens barrel instead of an aperture driving apparatus. A helicoid base plate 70 is fixed to the first stator 38. A lens holder 71 has a male helicoid portion 71a. The male helicoid portion 71a slidably fits in a female helicoid portion 70a of the helicoid base plate 70. With this structure, the lens holder 71 moves in the axial direction as it rotates.

A lens 72 is fixed to the lens holder 71. The position of the lens holder 71 changes in the optical axis direction as it rotates. The lens holder 71 has a groove 70b. This groove 70b receives the pin 31t of the magnet 31. Therefore, the lens holder 71 rotates together with the magnet 31 and moves in the axial direction as it rotates. That is, the position of the lens 72 changes in the optical axis direction as the magnet 31 rotates. Since the optical axis and optical path of the lens 72 are positioned in the hollow portion of the hollow motor, a compact lens barrel unit can be realized as a whole.

According to the third embodiment described with reference to FIGS. 12, 13, 14A and 14B and the modification described with reference to FIG. 15, the gaps between the magnet 31 and the first and second stators are defined by only the thicknesses of the first and second hollow fitting members. Therefore, the gaps can be maintained with high precision, and the output characteristics and performance of motors can be stabilized in mass production. With the third embodiment as well, the same effects as those of the first and second embodiments can be obtained. In addition, since the magnet 31 can be rotatably held by the hollow structure, a hollow doughnut-shaped motor can be realized. This makes it possible to form an actuator having a small size in the radial direction. Consequently, a motor can be obtained which has an optimal arrangement as an actuator that is mounted in the lens barrel of a camera and drives a shutter blade or aperture lens.

(Fourth Embodiment)

FIGS. 16, 17, 18A and 18B are views showing the fourth embodiment.

Figure 16:
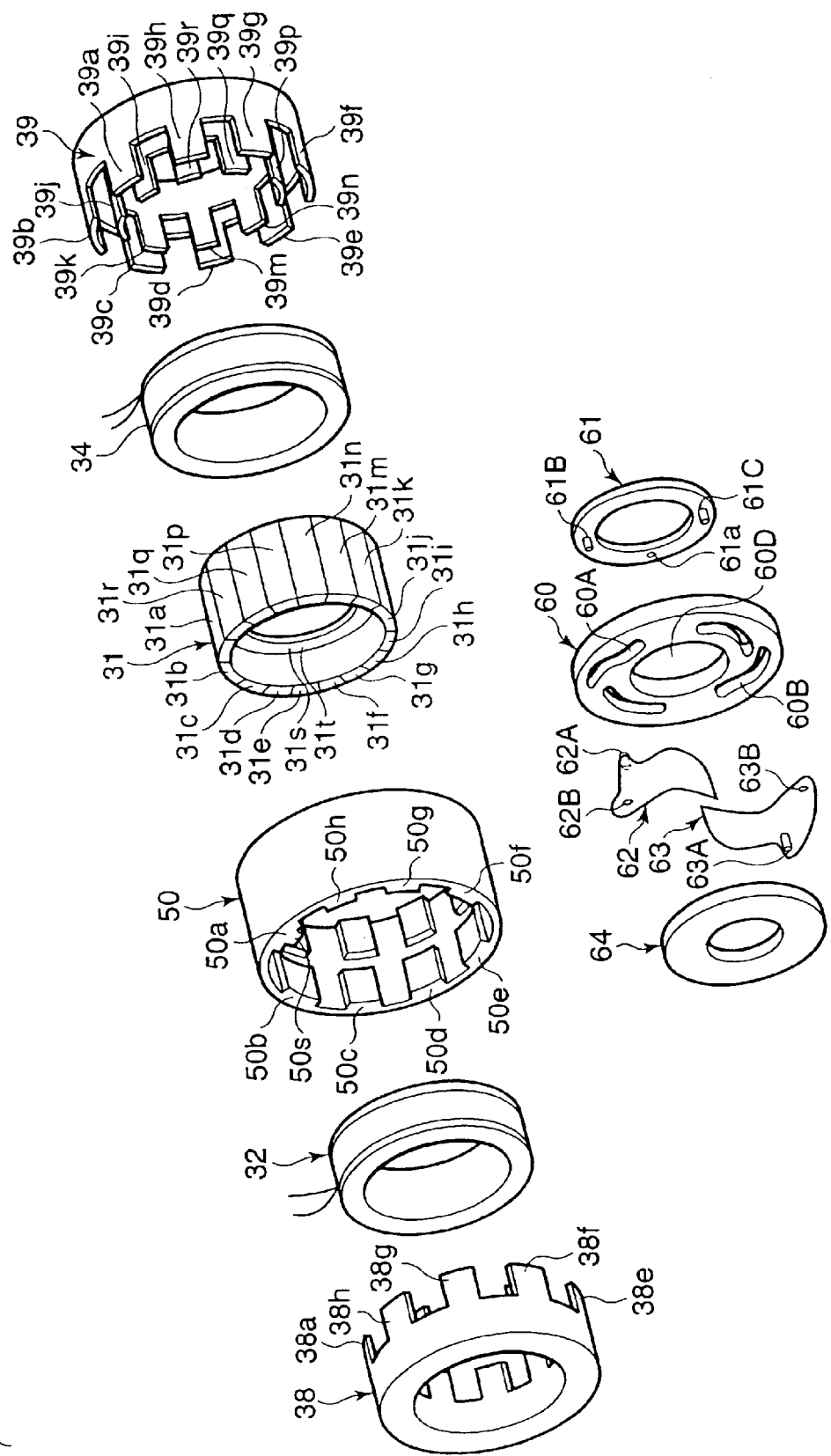
FIG. 16 is an exploded perspective view of a motor according to the fourth embodiment.
Figure 17:
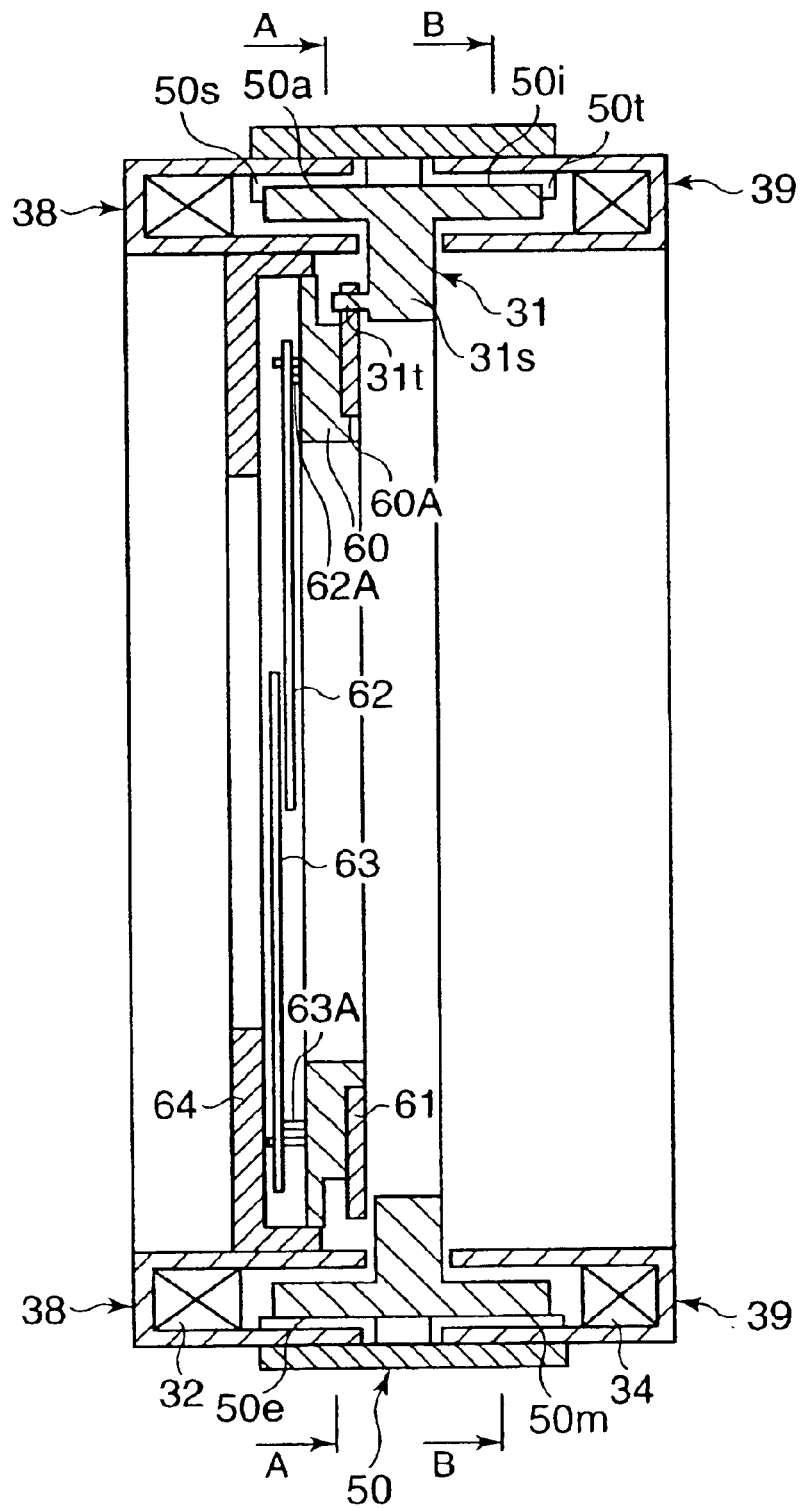
FIG. 17 is a longitudinal sectional view of the motor in FIG. 16 in the axial direction after assembly.
Figure 18A:
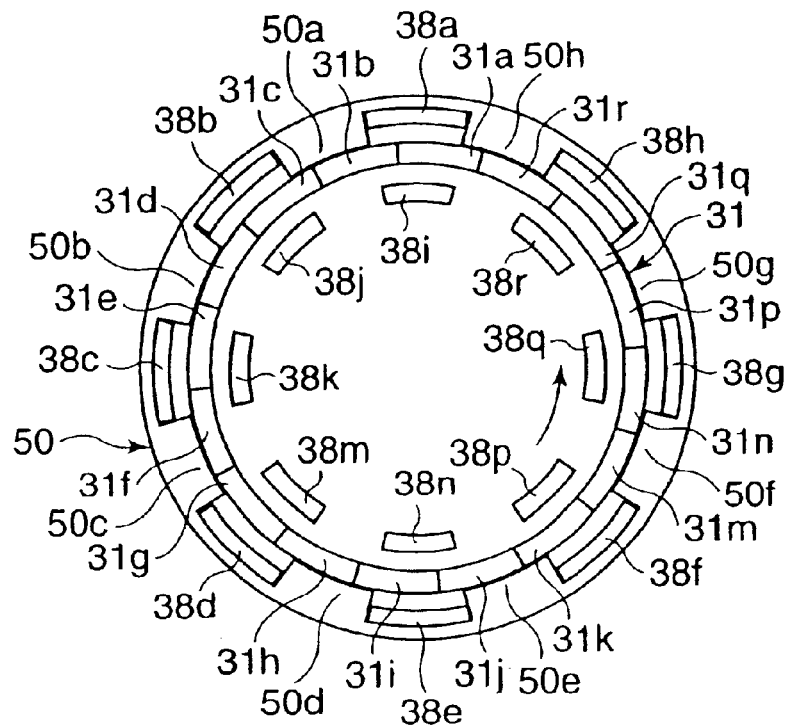
FIGS. 18A and 18B are sectional views, which are respectively taken along lines A-A and B-B in FIG. 17, and show rotated states of a rotor.
Figure 18B:
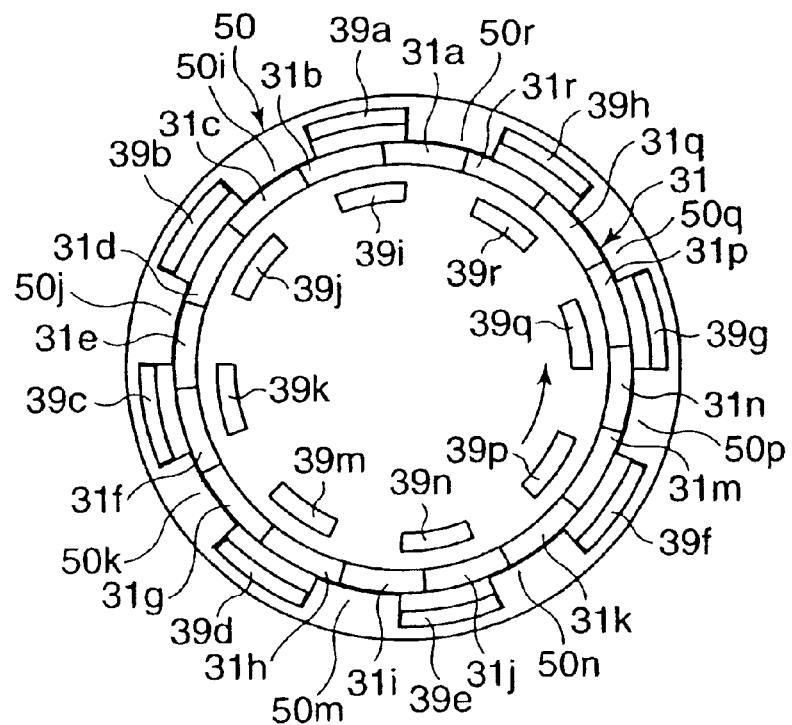

FIG. 16 is an exploded perspective view of a light amount adjusting apparatus. FIG. 17 is a sectional view of the light amount adjusting apparatus. FIGS. 18A and 18B are schematic sectional views respectively taken along lines A-A and B-B in FIG. 17.

Referring to FIGS. 16, 17, 18A and 18B, a magnet 31, first stator 38, second stator 39, first coil 32, second coil 34, and constituent members 60 to 64 of a stop driving apparatus have substantially the same arrangements as those in the third embodiment. The same reference numerals as in the third embodiment denote the same parts in the fourth embodiment, and a detailed description thereof will be omitted here.

Unlike the third embodiment, this embodiment does not have a coupling ring (20), first hollow fitting member (41), and second hollow fitting member (42), but has instead a fitting coupling member 50.

The fitting coupling member 50 is made of a nonmagnetic material, e.g., a plastic material, and has a thin hollow cylindrical shape. The fitting coupling member 50 is fixed on the outer cylinders of the first and second stators 38, 39. This fitting coupling member 50 has a plurality of projections in the radial direction. These projections include first projections 50a, 50b, 50c, 50d, 50e, 50f, 50g, and 50h formed in the same number as that of the teeth of the first outer magnetic pole portions, and second projections 50i, 50j, 50k, 50m, 50n, 50p, 50q, and 50r formed in the same number as that of the teeth of the second outer magnetic pole portions. The first and second projections are formed on end portions of the motor in the axial direction. The numbers of these projections may be smaller than those of the first and second outer magnetic pole portions. However, the projections are preferably arranged at equal intervals in the circumferential direction. The first projections fit between first outer magnetic pole portions 38a, 38b, 38c, 38d, 38e, 38f, 38g, and 38h. The second projections fit between second outer magnetic pole portions 39a, 39b, 39c, 39d, 39e, 39f, 39g, and 39h.

These projections slidably move on the outer circumferential surface of the magnet 31.

The projections of the fitting coupling member 50 come into contact with the portions between the outer magnetic pole portions of each stator to regulate the position of the stator in the thrust direction, i.e., the axial direction. Therefore, the fitting coupling member 50 can fix the first and second stators 38 and 39 at a predetermined distance from each other.

In addition, the first and second projections are arranged with a phase shift of 180/n° (11.25° in this embodiment). Therefore, when the first and second stators are fitted, the first and second stators are fixed with a phase shift of 180/n°.

Since the fitting coupling member 50 is made of a nonmagnetic material, the first and second stators 38 and 39 can be magnetically isolated from each other, thereby preventing the respective stators from magnetically influencing each other. This stabilizes the performance of the motor.

Figure 19:
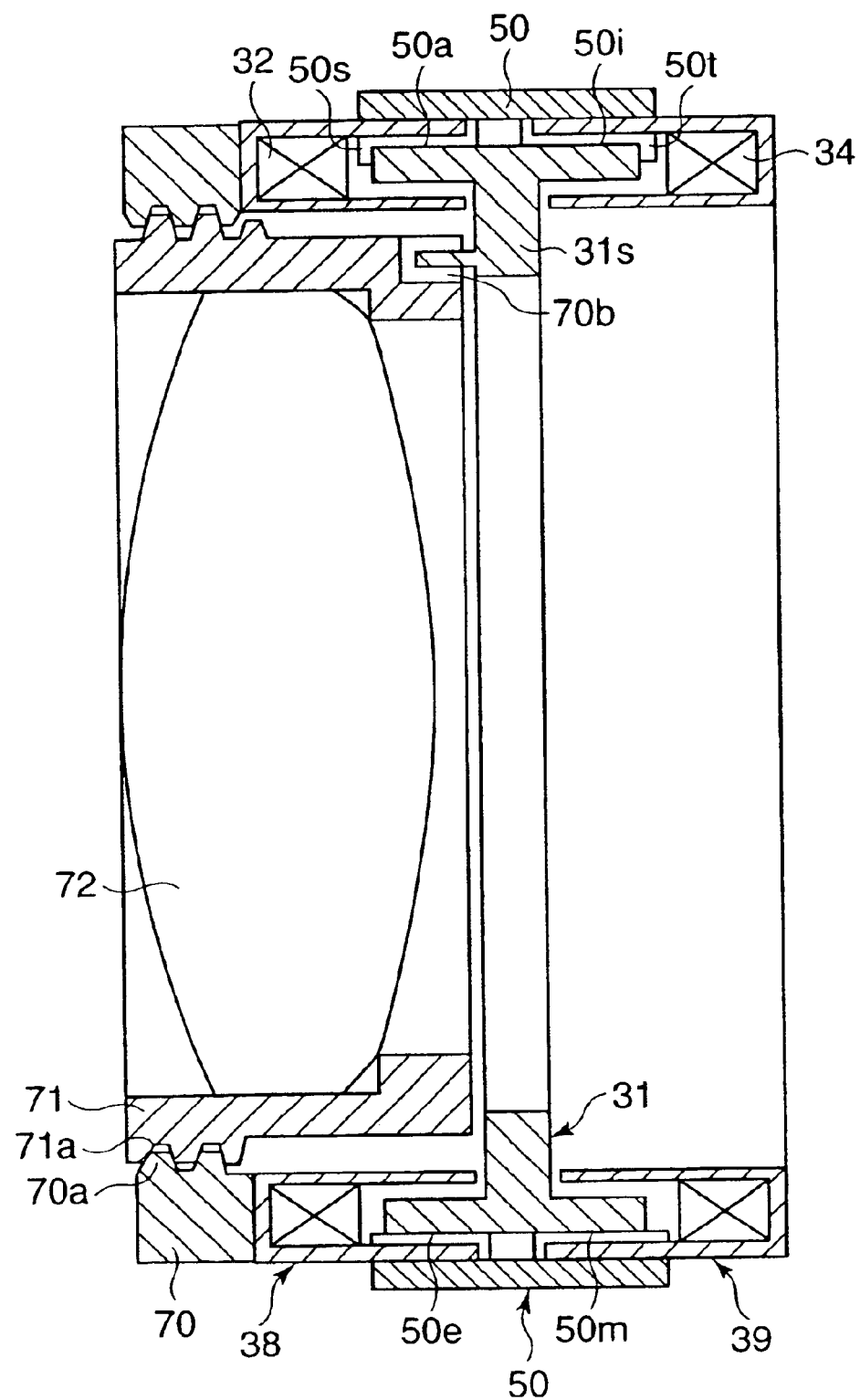
FIG. 19 is a view showing a modification of the motor in FIG. 16.
Figure 20:
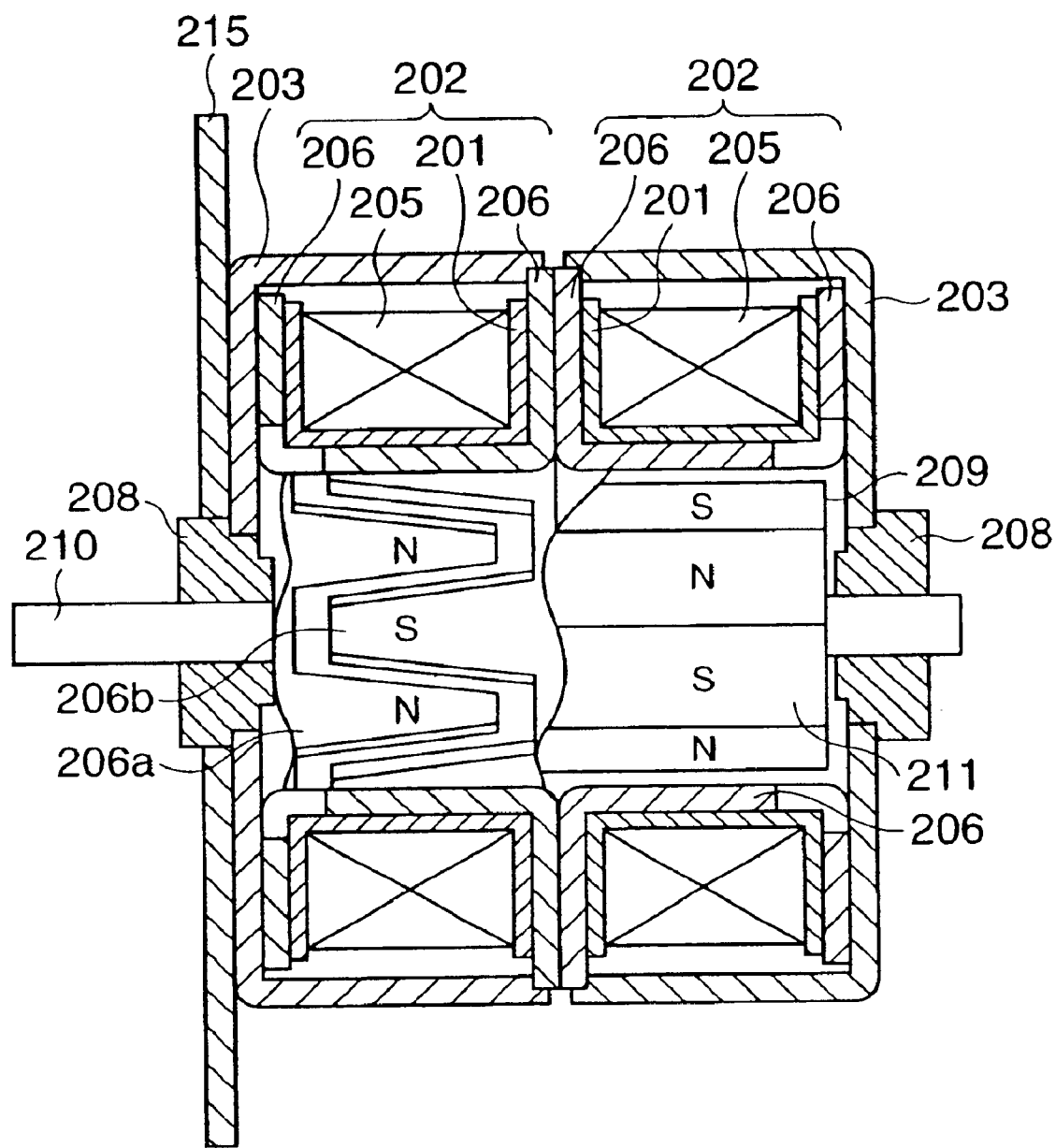
FIG. 20 is a longitudinal sectional view of a conventional stepping motor the axial direction.
Figure 21:
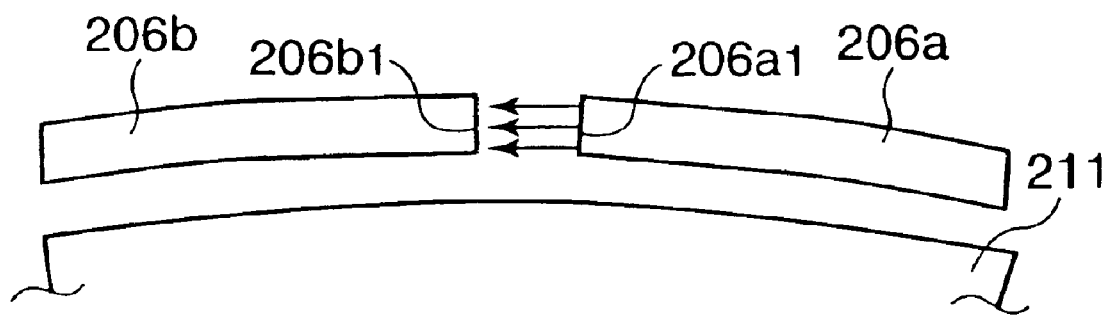
FIG. 21 is a partial sectional view schematically showing the state of a magnetic flux at the stator of the conventional stepping motor.
Figure 22:
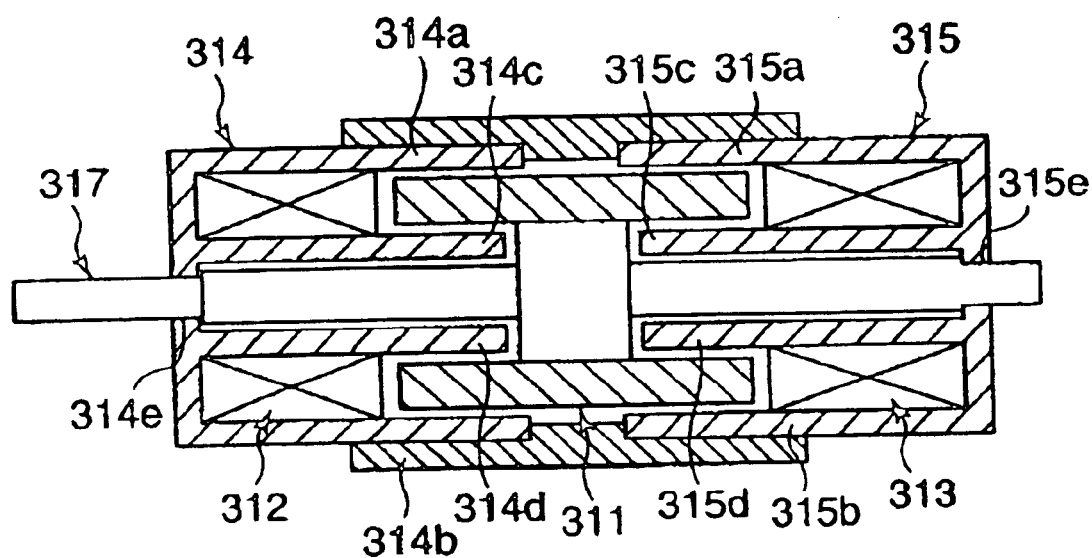
FIG. 22 is a sectional view showing a conventional compact stepping motor in the axial direction.

As shown in FIG. 19, projections 50s and 50t forming a regulating portion for regulating the movement of the magnet 31 in the thrust direction are formed on the inner circumferential surface of the fitting coupling member 50. The projections 50s and 50t are formed to clamp the magnet 31 from two (opposing) sides in the axial direction. That is, the position of the magnet 31 in the thrust direction is regulated by the projections 50s and 50t of the fitting coupling member 50.

Note that the distal end portions of the projections 50s and 50t are located closer to the inner circumferential side than the outer circumferential surface of the magnet 31. For this reason, when the magnet 31 and fitting coupling member 50 are to be assembled, one of the projections 50s and 50t is elastically deformed.

Since the inner circumferential surface of the fitting coupling member 50 slidably moves on the outer circumferential surface of the magnet, the magnet can be rotated while its position in the radial direction is maintained with high precision. In addition, since the magnet is rotatably held by the projections 50s and 50t, an output shaft for axially supporting the motor is not required. This makes it possible to realize a doughnut-shaped hollow motor. Therefore, this motor is suitably used for a lens driving apparatus or the like having a hollow portion as an optical axis.

FIGS. 18A and 18B are schematic sectional views respectively taken along the lines A-A and B-B in FIG. 17. An illustration of parts that are not necessary for the description of the operation of the motor, such as the aperture blades and output ring, is omitted from FIGS. 18A and 18B. The driving principle of the motor of this embodiment is the same as that of the second embodiment.

As in the third embodiment, a hole 61a of the output ring 61 receives a pin 31t of the magnet 31 so that the output ring 61 rotates together with the magnet 31. By sequentially switching the energizing directions of the first and second coils 32 and 34, the magnet 31 is sequentially rotated.

FIG. 19 shows a modification of the fourth embodiment. The above motor is used as a driving source for a lens barrel instead of an aperture driving apparatus. A helicoid base plate 70 is fixed to the first stator 38. A lens holder 71 has a male helicoid portion 71a. The male helicoid portion 71a sidably fits in a female helicoid portion 70a of the helicoid base plate 70. With this structure, the lens holder 71 moves in the axial direction as it rotates.

A lens 72 is fixed to the lens holder 71. The position of the lens holder 71 changes in the optical axis direction as it rotates. The lens holder 71 has a groove 70b. The groove 70b receives the pin 31t of the magnet 31. With this structure, the lens holder 71 rotates together with the magnet 31, and moves in the axial direction as it rotates. That is, when the magnet 31 rotates, the position of the lens 72 in the optical axis direction changes. Since the optical axis and optical path of the lens 72 are positioned in the hollow portion of the hollow motor, a compact lens barrel unit can be realized as a whole.

According to the fourth embodiment described with reference to FIGS. 16, 17, 18A and 18B and the modification described with reference to FIG. 19, the gaps between the magnet 31 and the first and second stators are defined by only the thickness of the fitting coupling member 50. In addition, the relative positions of the magnet 31 and first and second outer magnetic pole portions in the thrust direction are regulated by the fitting coupling member 50 near the outer magnetic pole portions. Therefore, the gaps between the magnet 31 and the respective magnetic pole portions can be regulated with high precision, and the output characteristics and performance of motors can be stabilized in mass production.

In addition, in this embodiment as well, since the magnet is rotatably held by the fitting coupling member 50 for holding the first and second stators 38 and 39, a hollow doughnut-shaped motor can be realized with a simple arrangement. This makes it possible to form an actuator having a small size in the radial direction. Consequently, a motor can be obtained which has an optimal arrangement as an actuator that is mounted in the lens barrel of a camera and drives a shutter blade or aperture lens.

What is claimed is:

1. An optical apparatus comprising:
a cylindrical magnet of which an outer circumferential surface is divided into portions in a circumferential direction, which portions are alternately magnetized to different poles;
first outer magnetic pole portions which are formed by gapping part of a cylinder from a distal end in an axial direction of said motor and oppose the outer circumferential surface of said magnet;
second outer magnetic pole portions which are formed by gapping part of a cylinder from a distal end in an axial direction of said motor and oppose the outer circumferential surface of said magnet;
first inner magnetic pole portions opposing an inner circumferential surface of said magnet;
second inner magnetic pole portions opposing the inner circumferential surface of said magnet;
a first coil which is located at a position between said first outer magnetic pole portions and said first inner magnetic pole portions in the axial direction of said magnet and excites said first outer magnetic pole portions;
a second coil which is located at a position between said second outer magnetic pole portions and said second inner magnetic pole portions on an opposite side to said first coil in the axial direction of said magnet and excites said second outer magnetic pole portions;
an annular member which is in contact with the inner circumferential surface of said magnet and fits with at least one of said first inner magnetic pole portions and said second inner magnetic pole portions; and
an aperture blade which is driven by said magnet to adjust an aperture amount.

2. An optical apparatus comprising:
a cylindrical magnet of which an outer circumferential surface is divided into portions in a circumferential direction, which portions are alternately magnetized to different poles;
first outer magnetic pole portions which are formed by gapping part of a cylinder from a distal end in an axial direction of said motor and oppose the outer circumferential surface of said magnet;
second outer magnetic pole portions which are formed by gapping part of a cylinder from a distal end in an axial direction of said motor and oppose the outer circumferential surface of said magnet;
first inner magnetic pole portions opposing an inner circumferential surface of said magnet;
second inner magnetic pole portions opposing the inner circumferential surface of said magnet;
a first coil which is located at a position between said first outer magnetic pole portions and said first inner magnetic pole portions in the axial direction of said magnet and excites said first outer magnetic pole portions;
a second coil which is located at a position between said second outer magnetic pole portions and said second inner magnetic pole portions on an opposite side to said first coil in the axial direction of said magnet and excites said second outer magnetic pole portions;
an annular member which is in contact with the inner circumferential surface of said magnet and fits with at least one of said first inner magnetic pole portions and said second inner magnetic pole portions; and
a lens driving member which is driven by said magnet to move in an optical axis direction.

3. An optical apparatus comprising:
a cylindrical magnet of which an outer circumferential surface is divided into portions in a circumferential direction, which portions are alternately magnetized to different poles;
first outer magnetic pole portions which are formed by gapping part of a cylinder from a distal end in an axial direction of said motor and oppose the outer circumferential surface of said magnet;
second outer magnetic pole portions which are formed by gapping part of a cylinder from a distal end in an axial direction of said motor and oppose the outer circumferential surface of said magnet;
first inner magnetic pole portions opposing an inner circumferential surface of said magnet;
second inner magnetic pole portions opposing the inner circumferential surface of said magnet;
a first coil which is located at a position between said first outer magnetic pole portions and said first inner magnetic pole portions in the axial direction of said magnet and excites said first outer magnetic pole portions;
a second coil which is located at a position between said second outer magnetic pole portions and said second inner magnetic pole portions on an opposite side to said first coil in the axial direction of said magnet and excites said second outer magnetic pole portions;
an annular member which is in contact with the inner circumferential surface of said magnet and fits with at least one of said first outer magnetic pole portions and said second outer magnetic pole portions; and
an aperture blade which is driven by said magnet to adjust an aperture amount.

4. An optical apparatus comprising:
a cylindrical magnet of which an outer circumferential surface is divided into portions in a circumferential direction, which portions are alternately magnetized to different poles;

first outer magnetic pole portions which are formed by gapping part of a cylinder from a distal end in an axial direction of said motor and oppose the outer circumferential surface of said magnet;

second outer magnetic pole portions which are formed by gapping part of a cylinder from a distal end in an axial direction of said motor and oppose the outer circumferential surface of said magnet;

first inner magnetic pole portions opposing an inner circumferential surface of said magnet;

second inner magnetic pole portions opposing the inner circumferential surface of said magnet;

a first coil which is located at a position between said first outer magnetic pole portions and said first inner magnetic pole portions in the axial direction of said magnet and excites said first outer magnetic pole portions;

a second coil which is located at a position between said second outer magnetic pole portions and said second inner magnetic pole portions on an opposite side to said first coil in the axial direction of said magnet and excites said second outer magnetic pole portions;

an annular member which is in contact with the outer circumferential surface of said magnet and fits with at least one of said first outer magnetic pole portions and said second outer magnetic pole portions; and a lens driving member which is driven by said magnet to move in an optical axis direction.

5. An optical apparatus comprising:

a cylindrical magnet of which an outer circumferential surface is divided into portions in a circumferential direction, which portions are alternately magnetized to different poles;

outer magnetic pole portions which are formed by gapping part of a cylinder from a distal end in an axial direction of said motor and oppose the outer circumferential surface of said magnet;

inner magnetic pole portions opposing an inner circumferential surface of said magnet;

a coil which is located at a position between said outer magnetic pole portions and said inner magnetic pole portions in the axial direction of said magnet and excites said outer magnetic pole portions;

an annular member which is in contact with the inner circumferential surface of said magnet and fits with said inner magnetic pole portions or said outer magnetic pole portions and has a hollow portion as an optical axis of a lens; and an aperture blade which is driven by said magnet to adjust an aperture amount.

6. An optical apparatus comprising:

a cylindrical magnet of which an outer circumferential surface is divided into portions in a circumferential direction, which portions are alternately magnetized to different poles;

outer magnetic pole portions which are formed by gapping part of a cylinder from a distal end in an axial direction of said motor and oppose the outer circumferential surface of said magnet;

inner magnetic pole portions opposing an inner circumferential surface of said magnet;

a coil which is located at a position between said outer magnetic pole portions and said inner magnetic pole portions in the axial direction of said magnet and excites said outer magnetic pole portion;

an annular member which is in contact with the inner circumferential surface of said magnet and fits with said inner magnetic pole portions or said outer magnetic pole portions; and a lens driving member which is driven by said magnet to move in an optical axis direction.

7. A blade driving apparatus comprising:

a cylindrical magnet of which an outer circumferential surface is divided into portions in a circumferential direction, which portions are alternately magnetized to different poles;

a stator which is made of magnetic material and has an outer cylinder and an inner cylinder;

a coil which is located at a position between said outer cylinder and said inner cylinder in the axial direction of said magnet and excites said outer cylinder and inner cylinder; and a blade which is driven by said magnet to adjust an aperture amount of said inner cylinder, wherein said outer cylinder has at least an outer magnetic pole portion which is formed by gapping part of said outer cylinder from a distal end in an axial direction of said magnet and opposes the outer surface of said magnet, and said inner cylinder opposes the inner surface of said magnet.

8. A blade driving apparatus according to claim 7, wherein said blade is a shutter blade.

9. A blade driving apparatus according to claim 7, wherein said blade is an aperture blade.

10. A lens driving apparatus comprising:

a cylinder magnet of which an outer circumferential surface is divided into portions in a circumferential direction, which portions are alternately magnetized to different poles;

a stator which is made of magnetic material and has an outer cylinder and an inner cylinder;

a coil which is located at a position between said outer cylinder and said inner cylinder in the axial direction of said magnet and excites said outer cylinder and said inner cylinder;

a lens which is located at an inner side of said inner cylinder; and a lens holder which holds said lens and is driven by said magnet to move said lens in the optical axis direction of said lens, wherein said outer cylinder has at least an outer magnetic pole portion which is formed by gapping part of said outer cylinder from a distal end in an axial direction of said magnet and opposes the outer surface of said magnet, and said inner cylinder opposes the inner surface of said magnet.

* * * * *

UNITED STATES PATENT AND TRADEMARK OFFICE
CERTIFICATE OF CORRECTION

PATENT NO. : 6,800,970 B2
DATED : October 5, 2004
INVENTOR(S) : Chikara Aoshima

It is certified that error appears in the above-identified patent and that said Letters Patent is hereby corrected as shown below:

Column 1,
Line 3, -- The present application is a division of Application No. 09/910,046, filed July 23, 2001, the entire contents of which is incorporated herein by reference. -- should be inserted .

Column 3,
Line 47, "lb,."should read -- lb, --.

Column 15,
Line 65, "38h" should read -- 38h. --.
Line 66, "." should be deleted.

Signed and Sealed this

First Day of February, 2005

JON W. DUDAS
*Director of the United States Patent and Trademark Office*